US011627195B2

(12) United States Patent
Rodriguez et al.

(10) Patent No.: US 11,627,195 B2
(45) Date of Patent: Apr. 11, 2023

(54) ISSUING ALERTS FOR IOT DEVICES

(71) Applicant: Aeris Communications, Inc., San Jose, CA (US)

(72) Inventors: Hector Aquiles Rodriguez, Chicago, IL (US); Vikas Kumar, Santa Clara, CA (US); Jins George, Freemont, CA (US)

(73) Assignee: AERIS COMMUNICATIONS, INC., San Jose, CA (US)

( * ) Notice: Subject to any disclaimer, the term of this patent is extended or adjusted under 35 U.S.C. 154(b) by 53 days.

(21) Appl. No.: 16/014,261

(22) Filed: Jun. 21, 2018

(65) Prior Publication Data

US 2019/0007511 A1  Jan. 3, 2019

Related U.S. Application Data

(60) Provisional application No. 62/523,751, filed on Jun. 22, 2017.

(51) Int. Cl.
*G06F 15/16* (2006.01)
*H04L 67/55* (2022.01)
(Continued)

(52) U.S. Cl.
CPC .............. *H04L 67/55* (2022.05); *G06F 16/23* (2019.01); *G08B 21/18* (2013.01); *G08B 25/14* (2013.01);
(Continued)

(58) Field of Classification Search
CPC ............ H04L 67/26; H04W 4/44; H04W 4/70
(Continued)

(56) References Cited

U.S. PATENT DOCUMENTS 6,239,707 B1   5/2001 Park
6,496,775 B2  12/2002 McDonald, Jr.
(Continued)

FOREIGN PATENT DOCUMENTS

CN     104835029   8/2015
WO     2014106299  7/2014
(Continued)

OTHER PUBLICATIONS

International Search Report and Written Opinion from International Application No. PCT/US16/46923 dated Oct. 27, 2016.
(Continued)

*Primary Examiner* — Duyen M Doan
(74) *Attorney, Agent, or Firm* — Brundidge & Stanger, P.C.

(57) ABSTRACT

In one example embodiment, a computer-implemented method and system for issuing alerts are disclosed. The method includes receiving device information for one or more mobile devices; sorting the received device information based on pre-determined criteria; evaluating the sorted device information to determine if the device information satisfies a specified condition; and issuing alert based on the determination. The system for issuing alerts includes a storage database, wherein the storage database receives device information for one or more mobile devices; an analytics engine, wherein the analytics engine sorts the received device information based on pre-determined criteria; a rules engine, wherein the rules engine evaluates the sorted device information to determine if the device information satisfies a specified condition and issues alerts based on the determination.

21 Claims, 12 Drawing Sheets

(51) Int. Cl.

| | |
|---|---|
| *G08B 21/18* | (2006.01) |
| *H04L 67/12* | (2022.01) |
| *H04W 4/70* | (2018.01) |
| *G06F 16/23* | (2019.01) |
| *G08B 25/14* | (2006.01) |
| *H04W 4/44* | (2018.01) |
| *H04W 4/021* | (2018.01) |
| *H04L 67/52* | (2022.01) |

(52) U.S. Cl.
CPC ............ *H04L 67/12* (2013.01); *H04L 67/52* (2022.05); *H04W 4/022* (2013.01); *H04W 4/44* (2018.02); *H04W 4/70* (2018.02); *G06F 16/2358* (2019.01)

(58) Field of Classification Search
USPC .................................................. 709/203, 206
See application file for complete search history.

(56) References Cited

U.S. PATENT DOCUMENTS

| | | |
|---|---|---|
| 6,651,001 B2 | 11/2003 | Apsell |
| 6,687,356 B1 | 2/2004 | Glitho |
| 6,931,309 B2 | 8/2005 | Phelan |
| 7,213,048 B1 | 5/2007 | Parupudi |
| 7,246,009 B2 | 7/2007 | Hamblen |
| 7,801,538 B2 | 9/2010 | Weiser |
| 7,848,765 B2 | 12/2010 | Phillips |
| 8,000,726 B2 | 8/2011 | Altman |
| 8,018,329 B2 | 9/2011 | Morgan |
| 8,135,505 B2 | 3/2012 | Vengroff |
| 8,346,230 B2 | 1/2013 | Goodman |
| 8,473,148 B2 | 6/2013 | Nielsen |
| 8,510,200 B2 | 8/2013 | Pearlman |
| 8,566,014 B1 | 10/2013 | Kozolchyk |
| 8,589,330 B2 | 11/2013 | Petersen |
| 8,593,277 B2 | 11/2013 | Nath |
| 8,595,696 B2 | 11/2013 | Maximilien et al. |
| 8,630,768 B2 | 1/2014 | McClellan |
| 8,667,456 B1 | 3/2014 | Czymontek |
| 8,725,569 B2 | 5/2014 | Liang |
| 8,755,824 B1 | 6/2014 | Wang |
| 8,756,010 B2 | 6/2014 | Gupta |
| 8,869,038 B2 | 10/2014 | Eick |
| 8,909,256 B2 | 12/2014 | Fraccaroli |
| 8,913,983 B2 | 12/2014 | Lorello |
| 8,949,022 B1 | 2/2015 | Fahrner |
| 8,971,930 B2 | 3/2015 | Li |
| 9,014,888 B2 | 4/2015 | Sukkarié |
| 9,043,222 B1 | 5/2015 | Kerr |
| 9,076,009 B2 | 7/2015 | Sathish |
| 9,076,165 B2 | 7/2015 | Busch |
| 9,104,738 B2 | 8/2015 | Kay et al. |
| 9,119,038 B2 | 8/2015 | Woods |
| 9,122,693 B2 | 9/2015 | Blom |
| 9,140,567 B2 | 9/2015 | Fryer |
| 9,141,266 B2 * | 9/2015 | McCormick .......... G06F 40/186 |
| 9,146,721 B1 | 9/2015 | Nagaraja |
| 9,210,534 B1 | 12/2015 | Matthieu |
| 9,225,519 B1 | 12/2015 | Fraccaroli |
| 9,250,887 B2 | 2/2016 | Lucovsky et al. |
| 9,275,114 B2 | 3/2016 | Milton |
| 9,277,362 B2 | 3/2016 | Li |
| 9,349,128 B1 | 5/2016 | Kerr |
| 9,424,751 B2 | 8/2016 | Hodges |
| 9,507,346 B1 | 11/2016 | Levinson |
| 9,576,295 B2 | 2/2017 | Volpe |
| 9,615,202 B2 | 4/2017 | Dal Santo |
| 9,661,470 B1 | 5/2017 | Du Bois |
| 9,712,486 B2 | 7/2017 | Johnson |
| 9,712,972 B2 | 7/2017 | Lynch |
| 9,741,191 B1 | 8/2017 | Wong |
| 9,774,994 B2 | 9/2017 | Chen |
| 9,792,567 B2 | 10/2017 | Khasis |
| 9,805,521 B1 | 10/2017 | Davidson |
| 9,817,948 B2 | 11/2017 | Swank |
| 9,826,345 B2 | 11/2017 | Haro |
| 9,838,843 B1 | 12/2017 | Bajaj |
| 9,871,865 B2 | 1/2018 | Shaashua |
| 9,878,663 B1 | 1/2018 | Kochura |
| 9,988,058 B2 | 6/2018 | Phillips |
| 10,015,353 B1 | 7/2018 | Perez |
| 10,037,668 B1 * | 7/2018 | DesGarennes ..... G08B 21/0492 |
| 10,070,261 B2 | 9/2018 | Dal Santo |
| 10,097,960 B2 | 10/2018 | Tung |
| 10,231,084 B2 | 3/2019 | Bagchi |
| 10,735,904 B2 | 8/2020 | Dhillon |
| 2004/0111195 A1 | 6/2004 | Vries |
| 2004/0193617 A1 | 9/2004 | Adler |
| 2005/0090978 A1 | 4/2005 | Bathory |
| 2005/0096009 A1 | 5/2005 | Ackley |
| 2005/0156715 A1 | 7/2005 | Zou |
| 2006/0248121 A1 | 11/2006 | Cacenco et al. |
| 2007/0143013 A1 | 6/2007 | Breen |
| 2007/0173991 A1 | 7/2007 | Tenzer |
| 2007/0173994 A1 * | 7/2007 | Kubo .................. G07C 5/0858 701/32.4 |
| 2008/0033791 A1 | 2/2008 | Jones |
| 2008/0125965 A1 | 5/2008 | Carani et al. |
| 2008/0319602 A1 | 12/2008 | McClellan |
| 2009/0009321 A1 | 1/2009 | McClellan |
| 2009/0079555 A1 | 3/2009 | Aguirre De Carcer et al. |
| 2009/0248883 A1 | 10/2009 | Suryanarayana |
| 2009/0019357 A1 | 11/2009 | Cudich |
| 2009/0275348 A1 | 11/2009 | Weinreich |
| 2009/0309789 A1 | 12/2009 | Verechtchiagine |
| 2009/0326991 A1 | 12/2009 | Wei |
| 2010/0075648 A1 | 3/2010 | Matsuoka et al. |
| 2010/0088163 A1 * | 4/2010 | Davidson ............... G06Q 10/08 340/425.5 |
| 2010/0094500 A1 | 4/2010 | Jin |
| 2010/0106603 A1 | 4/2010 | Dey |
| 2010/0203901 A1 | 8/2010 | Dinoff |
| 2010/0214068 A1 | 8/2010 | Nadkarni |
| 2010/0277307 A1 * | 11/2010 | Horton .................. G06Q 50/26 709/224 |
| 2010/0280734 A1 | 11/2010 | Brinton |
| 2010/0289644 A1 | 11/2010 | Slavin |
| 2010/0306735 A1 | 12/2010 | Hoff et al. |
| 2011/0112768 A1 | 5/2011 | Doyle |
| 2011/0126168 A1 | 5/2011 | Ilyayev |
| 2011/0178811 A1 | 7/2011 | Sheridan |
| 2011/0202591 A1 | 8/2011 | Reis |
| 2011/0208797 A1 | 8/2011 | Kim |
| 2011/0238457 A1 | 9/2011 | Mason |
| 2012/0058764 A1 | 3/2012 | Kang |
| 2012/0260228 A1 | 10/2012 | Mallick |
| 2012/0330722 A1 | 12/2012 | Volpe et al. |
| 2013/0031029 A1 | 1/2013 | Davidson |
| 2013/0055253 A1 | 2/2013 | Jubran |
| 2013/0066688 A1 | 3/2013 | Pinkus |
| 2013/0090106 A1 | 4/2013 | Mathews |
| 2013/0093603 A1 | 4/2013 | Tschirhart |
| 2013/0103307 A1 | 4/2013 | Sartipi |
| 2013/0141249 A1 * | 6/2013 | Pearlman ............... G09B 19/14 340/870.03 |
| 2013/0190967 A1 | 7/2013 | Hassib |
| 2013/0212130 A1 | 8/2013 | Rahnama |
| 2013/0245880 A1 | 9/2013 | McQuade |
| 2013/0254755 A1 | 9/2013 | Yousouf |
| 2013/0267253 A1 | 10/2013 | Case |
| 2013/0289819 A1 | 10/2013 | Hassib |
| 2013/0289873 A1 | 10/2013 | Mitchell |
| 2013/0297803 A1 | 11/2013 | Hate |
| 2013/0304347 A1 | 11/2013 | Davidson |
| 2013/0340305 A1 | 12/2013 | Mobley |
| 2013/0346336 A1 | 12/2013 | Murphy |
| 2014/0026113 A1 | 1/2014 | Farooqi |
| 2014/0031073 A1 | 1/2014 | Davis |
| 2014/0057648 A1 | 2/2014 | Lyman |
| 2014/0059695 A1 | 2/2014 | Parecki |
| 2014/0062695 A1 | 3/2014 | Rosen |
| 2014/0095214 A1 | 4/2014 | Mathe et al. |

(56) References Cited

U.S. PATENT DOCUMENTS

| | | |
|---|---|---|
| 2014/0141767 A1 | 5/2014 | Sharma |
| 2014/0155094 A1 | 6/2014 | Zises |
| 2014/0172294 A1 | 6/2014 | Karla |
| 2014/0215043 A1 | 7/2014 | Ryu et al. |
| 2014/0226470 A1 | 8/2014 | Kim |
| 2014/0274115 A1 | 9/2014 | Michalson |
| 2014/0274136 A1 | 9/2014 | Edge |
| 2014/0282380 A1 | 9/2014 | Abrahams |
| 2014/0325048 A1 | 10/2014 | Benchorin |
| 2014/0325394 A1 | 10/2014 | Hamill |
| 2014/0351411 A1 | 11/2014 | Woods |
| 2014/0357295 A1 | 12/2014 | Skomra |
| 2014/0359552 A1 | 12/2014 | Misra |
| 2014/0370911 A1 | 12/2014 | Gorgenyi |
| 2014/0380264 A1 | 12/2014 | Misra et al. |
| 2015/0012908 A1 | 1/2015 | Farooqi |
| 2015/0095355 A1 | 4/2015 | Patton |
| 2015/0106206 A1 | 4/2015 | Vengroff |
| 2015/0135163 A1 | 5/2015 | Mun |
| 2015/0149980 A1 | 5/2015 | Zhong |
| 2015/0163626 A1 | 6/2015 | Zimmer |
| 2015/0163630 A1 | 6/2015 | Hughes |
| 2015/0173037 A1 | 6/2015 | Pijl |
| 2015/0180746 A1 | 6/2015 | Day, II |
| 2015/0181016 A1 | 6/2015 | Jain |
| 2015/0245189 A1 | 8/2015 | Nalluri |
| 2015/0264527 A1 | 9/2015 | Wang |
| 2015/0271033 A1 | 9/2015 | Srivastava et al. |
| 2015/0278759 A1 | 10/2015 | Harris |
| 2015/0304175 A1 | 10/2015 | Maes |
| 2015/0350843 A1 | 12/2015 | Jensen et al. |
| 2016/0003627 A1 | 1/2016 | Bonhomme |
| 2016/0041833 A1 | 2/2016 | Standley et al. |
| 2016/0042303 A1 | 2/2016 | Medina |
| 2016/0050536 A1 | 2/2016 | You |
| 2016/0057209 A1 | 2/2016 | Parikh |
| 2016/0066141 A1 | 3/2016 | Jain |
| 2016/0071333 A1 | 3/2016 | Haidar |
| 2016/0073229 A1 | 3/2016 | Haro |
| 2016/0083697 A1 | 3/2016 | Phillips |
| 2016/0103657 A1 | 4/2016 | Zhang et al. |
| 2016/0104096 A1 | 4/2016 | Ovick |
| 2016/0116596 A1 | 4/2016 | Rajala |
| 2016/0124742 A1 | 5/2016 | Rangasamy |
| 2016/0150021 A1 | 5/2016 | Britt |
| 2016/0173404 A1 | 6/2016 | Pouyllau |
| 2016/0203651 A1 | 7/2016 | Heath |
| 2016/0247330 A1 | 8/2016 | Rork |
| 2016/0284184 A1 | 9/2016 | Bean |
| 2016/0286355 A1 | 9/2016 | Shur |
| 2016/0357522 A1 | 12/2016 | Wee |
| 2016/0371553 A1 | 12/2016 | Farnham, IV |
| 2017/0006135 A1 | 1/2017 | Siebel |
| 2017/0006419 A1 | 1/2017 | Rajala |
| 2017/0006430 A1 | 1/2017 | Chao |
| 2017/0024937 A1* | 1/2017 | Ramesh ............... B60L 58/12 |
| 2017/0076511 A1* | 3/2017 | Busch-Sorensen ...... G07C 5/08 |
| 2017/0111765 A1 | 4/2017 | Benegal |
| 2017/0171204 A1 | 6/2017 | Forood |
| 2017/0203633 A1 | 7/2017 | High |
| 2017/0244841 A1 | 8/2017 | Costandi |
| 2017/0270792 A1 | 9/2017 | Breton |
| 2017/0323259 A1 | 11/2017 | Gillen |
| 2017/0349058 A1 | 12/2017 | Bernier |
| 2017/0359237 A1 | 12/2017 | Hao |
| 2017/0366933 A1 | 12/2017 | Chen |
| 2018/0005522 A1 | 1/2018 | Pogula |
| 2018/0049001 A1 | 2/2018 | Volozh |
| 2018/0063666 A1 | 3/2018 | Broodney |
| 2018/0120826 A1* | 5/2018 | Rhim ............... H04L 41/065 |
| 2018/0199239 A1 | 7/2018 | Sabater Maroto |
| 2018/0255428 A1 | 9/2018 | Bagchi |
| 2018/0302476 A1 | 10/2018 | Perez |
| 2018/0365785 A1 | 12/2018 | Boss |
| 2018/0372503 A1 | 12/2018 | Bagchi |
| 2019/0266518 A1 | 8/2019 | Medina |
| 2019/0285426 A1 | 9/2019 | Mitchell |

FOREIGN PATENT DOCUMENTS

| | | |
|---|---|---|
| WO | 2015143416 | 9/2015 |
| WO | 2016025495 | 2/2016 |

OTHER PUBLICATIONS

Brouwers et al., Dwelling in the canyons: Dwelling detection in Urban Environments Using GPS, Wi-Fi, and Geolocation, Dec. 14, 2011.

Boukhechba et al., Hybrid battery-friendly mobile solution for extracting users' visited places, Dec. 31, 2016.

Perera et al., Energy Efficient Location and Activity-aware On-Demand Mobile Distributed Sensing Platform for Sensing as a Service in IoT Clouds, http://arxiv.org/abs/1601.00428, Apr. 1, 2016.

Merlino et al., Mobile crowdsensing as a service: A platform for applications on top of sensing Clouds, http://www.sciencedirect.com/science/article/pii/S0167739X15002976, Mar. 2016.

International Search Report and Written Opinion from International Application No. PCT/US16/46924 dated Oct. 28, 2016.

Wikipedia, "Virtual Machine," 2014, pp. 1-9, downloaded from the Wayback Machine Internet Archive at ,<url>:https://web.archive.org/web/20140402003043/https://en.wikipedia.org/wiki/Virtual_machine.

Wikipedia, "Virtual Machine, "2013, pp. 1-11, downloaded from the Wayback Machine Internet Archive at <url>:https://web.archive.org/web/20130402165412/https://en.wikipedia.org/wiki/Wireless_sensor_network.

GeoFencing & Alerts, myGeoTracking, Abaqus Inc., Jul. 11, 2016, 1 page, Retrieved from: http://www.mygeotracking.com/solutions/pdf/geo_fencing_alerts.pdf.

Almomani et al., "Ubiquitous GPS vehicle tracking and management system", In Applied Electrical Engineering and Computing Technologies (AEECT), Dec. 31, 2011, IEEE Jordan Conference on, pp. 1-6.

Dennis Mbuvi, "Airtel Provide Connectivity to 2nk Sacco's Frotcom Fleet Management System", Airtel, Africa News Service, Feb. 2013.

Gerla et al., "Internet of vehicles: From intelligent grid to autonomous cars and vehicular clouds", In Internet of Things (WF-IoT), 2014 IEEE World Forum on, pp. 241-246., Dec. 31, 2014.

Rusu et al., "Localization in large-scale underground environments with RFID", 24th Canadian Conference on Electrical and Computer Engineering (CCECE), May 31, 2011.

Jin et al.," An information framework for creating a smart city through internet of things", IEEE Internet of Things Journal, 1(2), pp. 112-121, Dec. 31, 2014.

Gantait et al., Use vehicle sensor data to execute smart transactions in Blockchain, IBM, Jun. 5, 2017., Retrieved from Internet: https://www.ibm.com/developerworks/cloud/library/cl-blockchain-for-cognitive-iot-apps2/.

Adelabu, Design and Construction of a Vehicle Tracking and Accident Alert System Using GPS and GSM Module, Nov. 30, 2017., Retrieved from the Internet: http://repository.fuoye.edu.ng/bitstream/123456789/1441/1/DESIGN%20AND%20CONSTRUC-TION%20%20OF%20A%20VEHICLE%20TRACKING%20AND%20ACCIDENT%20ALERT%20SYSTEM%20%20USING%20%20GPS%20%20AND%20GSM%20MODULE.pdf. (C) Nov. 2017.

AT&T, Fleet management and tracking, Feb. 26, 2018., Retrieved from the Internet: https://www.business.att.com/solutions/Service/internet-of-things/vehicle-solutions/iot-connected-fleet/. (C)2018. Earliest publication date via Wayback archive:http://web.archive.org/web/20180226093503/https://www.business.att.com/solutions/Service/internet-of-things/vehicle-solutions/iot-connected-fleet/.

Frey, IoT ushers in a new era for supply chain fulfillment, Oct. 25, 2017, Retrieved from the Internet: https://internetofthingsagenda.techtarget.com/blog/IoT-Agenda/IoT-ushers-in-a-new-era-for-supply-chain-fulfillment.

(56) References Cited

OTHER PUBLICATIONS

International Search Report and Written Opinion from International Application No. PCTUS1838825 dated Sep. 18, 2018.
Wei-Tek Tsai et al., "Service-Oriented Cloud Computing Architecture," 2010 [retrieved on May 9, 2019], Seventh International Conference on Information Technology: New Generations, pp. 684-689, downloaded from: https://ieeexplore.ieee.org/. 2010.
B Loganayagi et al., "Creating Virtual Platform for Cloud Computing," 2010 [retrieved on May 9, 2019], 2010 IEEE International Conference on Computational Intelligence and Computing Research, pp. 1-4, downloaded from: https://ieeexplore.ieee.org 2010.
Radha Guha et al, "Impact of Web 2.0 and Cloud Computing Platform on Software Engineering," 2011 [retrieved on May 9, 2019], International Symposium on Electronic System Design, pp. 213-218, downloaded from:https//ieeexplore.ieee.org 2011.

* cited by examiner

FIG. 3  Time Interval based storm topologies: e.g. Offline Alert

Architecture for Topology which triggers Jobs at a given time or interval

FIG. 4 Exemplary Implementation Using Storm Technology

FIG. 5  Exemplary Implementation Using Flink Technology
Example: Fuel Level Alert, Speeding Alert Example: Unplugged or Low Voltage Alert for monitoring device installed in the vehicle

600

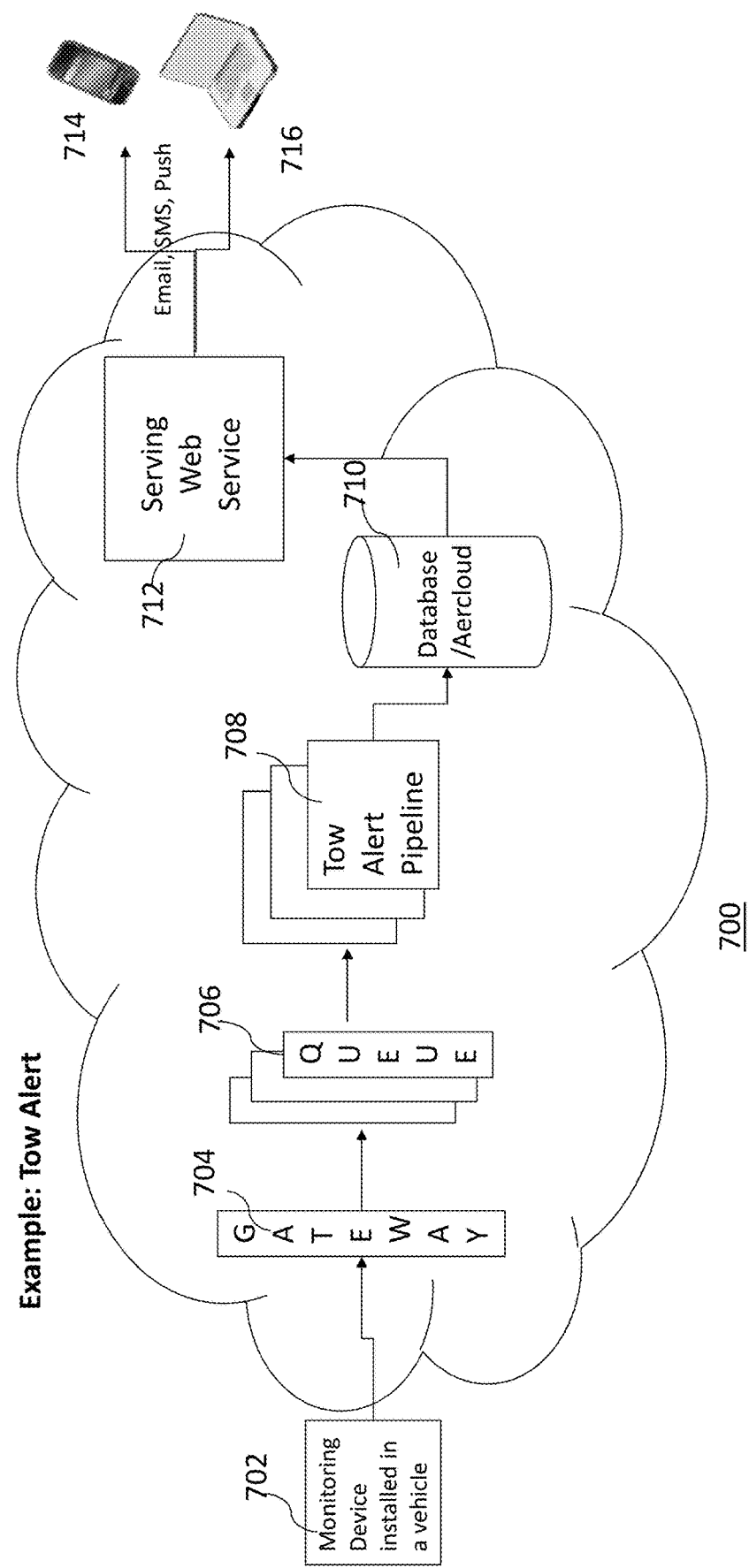
FIG. 7A Example: Tow Alert

Exemplary User Interface for Setting Alerts

800'

+ Add a New Alert:
- Select Alert Type: (exemplary list of alerts)
  - Stop time
  - Dwell Time
  - Idle Time
  - Speeding
  - Offline
  - Crash
  - Fuel Drop
  - Unplugged Device
  - Tow
  - Secure Parking
- Select conditions applicable for each alert to be added
- If Geofence or Dwell time Alert is selected, the location of the place may be displayed on the map Example: Speeding Alert, Level of Severity

ISSUING ALERTS FOR IOT DEVICES

CROSS-REFERENCE TO RELATED APPLICATIONS

Under 35 USC 119(e), this application claims priority to U.S. provisional application Ser. No. 62/523,751, entitled "ISSUING ALERTS FOR IoT DEVICES", filed on Jun. 22, 2017 and is related to U.S. application Ser. No. 16/015,017, entitled "VISUALIZATION: ICON, COLOR CODING AND HISTORICAL ROUTING INFORMATION FOR IoT DEVICES", filed on Jun. 21, 2018, all of which are herein incorporated by reference in their entirety.

FIELD OF THE INVENTION

The embodiments described herein relate generally to network connected devices and more particularly to issuing alerts regarding geofencing, device behavior and/or operator behavior for devices connected to a wireless communication network.

BACKGROUND

In many Internet-of-Things (IoT)/Machine-to-Machine (M2M) solutions, particularly running on moving machines, for example, vehicles, it may be useful to the fleet operator to receive alerts regarding geofencing, device behavior and/or operator behavior for devices in a fleet.

SUMMARY

In one example embodiment, a method for issuing alerts is disclosed. The method includes receiving device information for one or more mobile devices; sorting the received device information based on pre-determined criteria; evaluating the sorted device information to determine if the device information satisfies a specified condition; and issuing alert based on the determination.

In another example embodiment, a system for issuing alerts is disclosed. The system for issuing alerts includes a storage database, wherein the storage database receives device information for one or more mobile devices; an analytics engine, wherein the analytics engine sorts the received device information based on pre-determined criteria; a rules engine, wherein the rules engine evaluates the sorted device information to determine if the device information satisfies a specified condition and issues alerts based on the determination.

In an embodiment, a computer readable medium for having executable instructions stored therein for issuing alerts is disclosed. The non-transitory computer-readable medium having executable instructions stored therein that, when executed, cause one or more processors corresponding to a system having a database and a user interface to perform operations include receiving device information for one or more mobile devices; sorting the received device information based on pre-determined criteria; evaluating the sorted device information to determine if the device information satisfies a specified condition; and issuing an alert based on the determination.

BRIEF DESCRIPTION OF THE DRAWINGS

FIG. 7A-B illustrates exemplary system and process flow for the system and method for issuing alerts according to an embodiment described herein.

DETAILED DESCRIPTION

The embodiments described herein relate generally to network connected devices and more particularly to issuing alerts regarding geofencing, device behavior and/or driver behavior for devices that are capable of moving connected to a wireless communication network, e.g., devices belonging to a commercial fleet of vehicles. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the embodiments described herein are not intended to be limited to the embodiments shown, but is to be accorded the widest scope consistent with the principles and features described herein.

Many Internet-of-Things (IoT)/Machine-to-Machine (M2M) solutions, particularly running on moving machines, for example, commercial fleets of vehicles, it may be useful to the fleet operator to receive alerts regarding geofencing, vehicle behavior and/or driver behavior for devices in a fleet. Alerts are conditions that when hitting a specific thresholds will send a notification to the user in different ways, online, SMS, email. Alerts can be categorized by driver, vehicle or jobs; depending on the condition and sometimes duration of the condition an alert will be sent. In addition, as described in further detail below, real-time events are evaluated in conjunction with analytics based data and incorporate other external data.

The system and method described herein includes defining the type of alerts, threshold conditions for issuing alerts and repeat rules for backend and edge.

Figure 1:
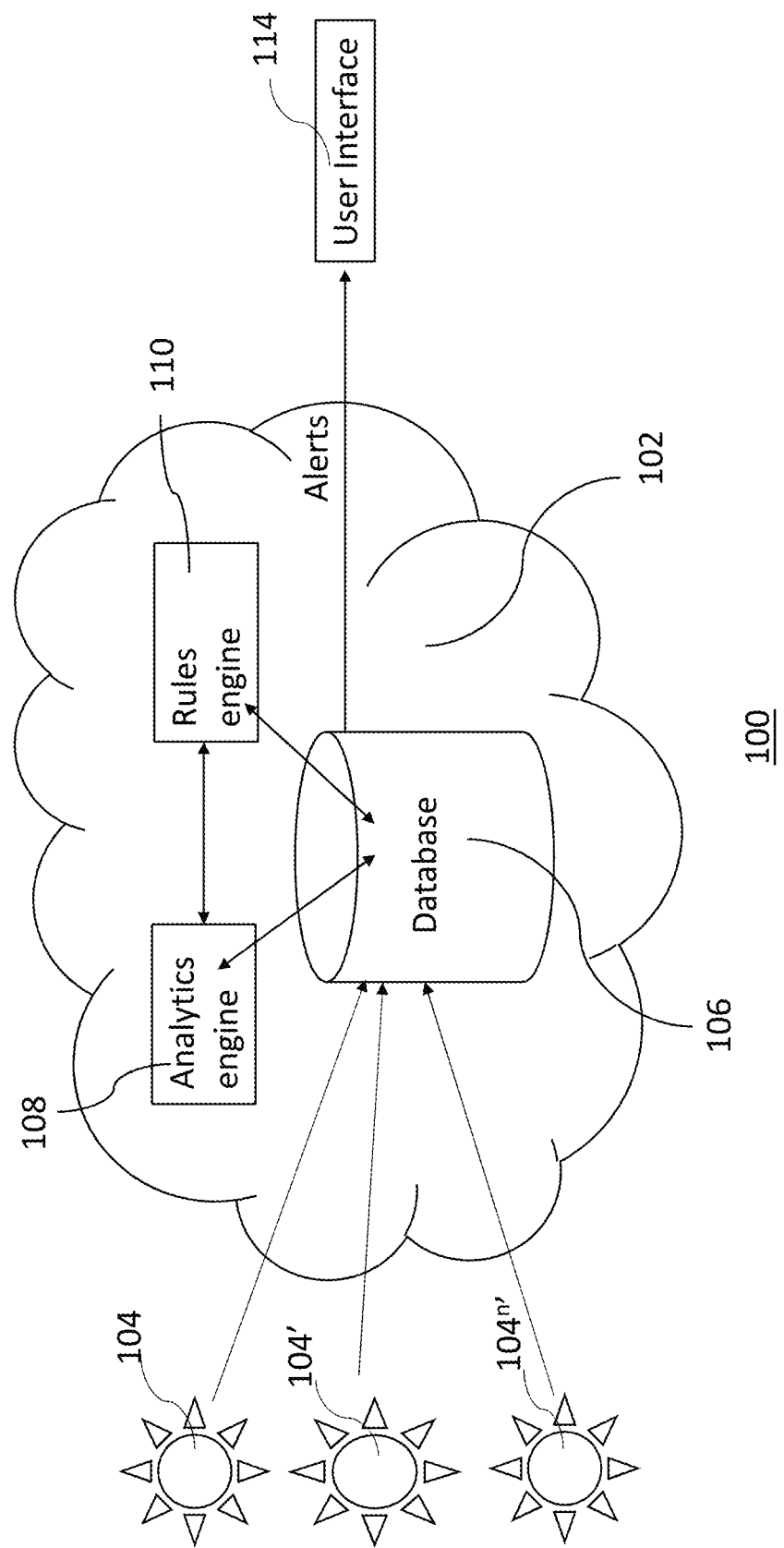
FIG. 1 illustrates an overview diagram for the method and system for issuing alerts according to an embodiment described herein.

FIG. 1 illustrates an overview diagram for the method and system for issuing alerts for network connected devices according to an embodiment described herein. FIG. 1 illustrates system configuration 100 including mobile devices 104, 104' . . . 104'", a data processing system 102 including a database 106, analytics engine 108, rules engine 110, and a user interface 114. A system for issuing alerts includes a storage database 106, wherein the storage database 106 receives device information for one or more mobile devices 104; an analytics engine 108, wherein the analytics engine 108 sorts the received device information based on predetermined criteria; a rules engine 110, wherein the rules engine 110 evaluates the sorted device information to determine if the device information satisfies a specified condition and issues alerts based on the determination.

The mobile devices 104, 104', . . . 104''' may include communication devices, for example, vehicles connected to the cellular network or cellular-enabled devices via SIMs that are installed in the communication devices either integrated in the vehicle itself or removably installed in the vehicle on each of the fleet vehicle. These communication devices these could be devices using a radio module and Wifi, or any other wireless communication technology that are capable of transmitting relevant vehicle data to database 106 and/or the data processing system 102 of the monitoring system. In an embodiment, the devices, e.g., vehicles, may have monitoring devices installed in them, that are also capable of communication.

Moving devices either directly or via monitoring devices installed in them, send various data to a database as they perform their jobs. In an embodiment, this data may be processed further by extracting information for relevant fields using application programming interface (API) keys to read data contained in specific data fields.

In an embodiment, the data may be containerized and stored based on a subscription identifier. The data may be accessed through APIs using API keys and user authentication to securely transmit the data. Management of data received from these devices and access to application specific data to be used by specific applications is described in a related U.S. patent application Ser. No. 14/207,378, entitled, "MANAGEMENT OF DATA FEEDS FROM DEVICES AND PUBLISHING AND CONSUMPTION OF DATA" filed Mar. 12, 2014 and is herein incorporated by reference in its entirety.

In another embodiment, the device data is sent directly from the devices to the storage database may also be used, where the data may be accessed through APIs using API keys and user authentication to securely transmit the data.

In yet another embodiment, the device data is sent to a data processor, e.g., an adapter, where it is processed and then sent to the storage database to be used by the analytics engine.

Various data are collected from the moving devices either directly or via monitoring devices installed in them, as they perform their jobs. For example, devices stream data including fuel level, coolant temperature/level, speed, location, accidents, odometer readings etc. The devices may report On-Board Diagnostics version 2 Diagnostic Trouble Code (OBDII DTC), J1939 (which is a standard for communication among vehicle components by Society of Automotive Engineers (SAE)), fault, battery voltage and faults regarding other components such as lamps. Backend systems may receive device status as ignition on and off or changes in ignition status, idle time, e.g., when ignition is on but no movement is recorded in terms of location with respect to time, e.g., GPS movement. Threshold limits for issuing various alerts may be set on the system backend, including but not limited to odometer readings, maintenance dates as reminders scheduled by users of the device, Geofence for start and end job locations, Geofence names as places, time, duration, voltage, speed, place, ignition status, radius for geofence, fuel level, power level/battery status, monitoring device status. Additionally, the threshold limits may be set in combination with other applications, e.g., threshold speed limits may be set on the system backend and integrated with mapping street speed limits using an application programming interface (API).

Monitoring system Alerts may be used to monitor the activity of vehicles and/or their drivers. For example, configuring an alert may be useful if a vehicle is stopping too long at a particular place, which indicates a potential unproductive situation. Similarly, configuring an alert may be useful when the vehicle is accelerated to an excessive speed that may be deemed to be dangerous. System administrators or fleet operators can create and configure time based and conditional alerts by setting their threshold and severity.

The system and method may issue alerts based on exceptions, for example, driver speeding, driver crash event, fuel theft, exception based geofence alerts may include limitations or conditions such as timeframe or place, vehicle stop above a predetermined duration of time limit (engine off) (for example, if the vehicle is stopped at a location where it's not supposed to stop and/or for a duration it is not supposed to stop, e.g., for 3 hours, 6 hours etc.) or if the device is offline for more than a specified period of time. Threshold parameters for issuing alerts may be set by the user or the fleet operator or a person responsible for defining/determining threshold conditions also known as pre-defined or predetermined conditions for setting alerts or may be provided by the user or fleet operator while setting the alerts. In an embodiment, default values for threshold conditions may be provided by the application as pre-defined conditions which may or may not be editable by the user or the fleet operator or the person responsible for setting alerts.

Additionally, or alternatively, the system and method may issue towing alerts and/or secure parking alerts which may be useful if the user/fleet operator would like to receive an alert if their vehicle gets towed or is moved from a parking location.

In an embodiment, a user or the fleet operator may be able to edit or change parameters for an existing alert in the setup screen. Additionally or alternatively, the user or the fleet operator may be able to enable/disable alerts in the setup screen. As a default all alerts may be disabled when created or may be enabled when created. Threshold values described herein are exemplary only and other values may be used as predetermined values or may be determined by the user or the fleet operator.

Additionally or alternatively, the user or the fleet operator may be able to set the alert condition(s) (<, <=, >=, =, in, out) when applicable and in some cases the condition may be listed as "N/A". Additionally or alternatively, the user or the fleet operator may be able to set the alert value threshold(s) that will trigger the alert. Additionally or alternatively, the user or the fleet operator may be asked to view and select the alerts units when setting up the alerts (meters, kilometers, seconds, minutes, hours, gallons, liters, etc.) or may be able to set the units when setting up the alerts.

Any or all of the alerts described herein may be classified into different categories based on severity of the situation, for example, critical, warning, information etc. and may be denoted by different color coding, for example, Critical=Red, Warning=Orange and Information=Clear.

The rules for updating and resetting the alerts may also be provided by the application, for example,

---

"If current state != alert AND speed > [threshold]
　　Then if moving average > threshold (window = x reading, default is 10)

```
        Then generate alert
            Else continue
        Else continue
Reset Speeding Alert:
    If current state = alert AND speed < [threshold]
        Then if moving average < threshold (window = x reading,
        default is 10)
            Then reset alert
            Else continue
Else continue"
```

Other alerts described herein may also be updated and reset similarly, e.g., "offline" may be used instead of "speed" with a value of threshold provided as duration of time.

Different use cases discussed herein may use one or more processes described in the description accompanying figures. The example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 2:
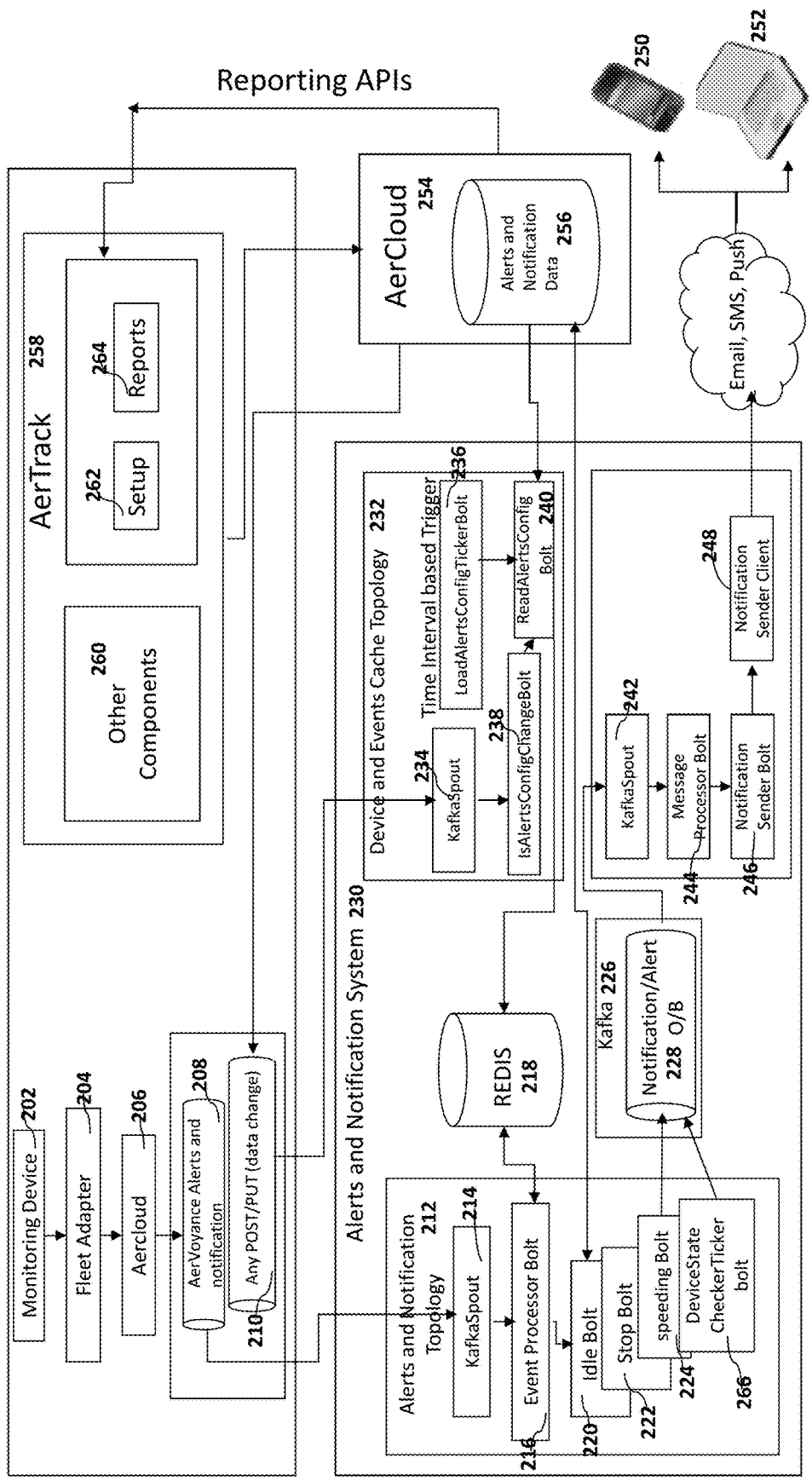
FIG. 2 illustrates exemplary system and process flow for the system and method for issuing alerts according to an embodiment described herein.

FIG. 2 illustrates exemplary system 200 and process flow for the method for issuing alerts regarding geofencing and driver behavior according to an embodiment described herein. FIG. 2 illustrates alert identification based on data received from monitoring devices. Monitoring Device 202 installed in the vehicle sends the data to a fleet adapter 204. The fleet adapter 204 is a network endpoint component which understands the device protocol, e.g., TCP, UDP, and interprets the received data and sends to a database 206 which may be a physical database or may be a cloud database, shown as AerCloud, which publishes the messages to queue topic 208 and 210, e.g., AerVoyance. This Device data is then consumed by alert and notification system 230. The alert and notification topology 212 includes Kafka spout 214 which decodes device data. Event processor bolt 216 processes, e.g., translates, data from one form into another, or if the event arrived late based on time stamp, checking for validity of the data, the decoded device data. The decoded and processed device data is then stored in a memory system 218, e.g., Redis. This processed data is then consumed or read from the queue by different type of alerts engines, e.g., idle bolt 220, stop bolt 222, speeding bolt 224. Once an alert identified by these different kinds of bolts or processors, it is published as an alert event to a queue 226. The alert event is then read by a notification system 228 and is then transferred to message processor 244 via queue, e.g., Kafka Spout 242. The message processor/bolt 244 then transfers the received alert event to a notification sender processor 246. The notification sender processor/bolt 246 transfers a final notification to a notification sender client 248. This notification may be delivered to the user interface 250 and/or 252 via Email, SMS or Push notifications.

In an embodiment, an alert may be setup from the application user interface, e.g., AerTrack UI by the user by providing alert definition, and published to queue 234 by the cloud database 254, e.g., Aercloud, and alert definitions are retrieved by caching system 232. The caching system 232 checks for any changes in alert definitions by the user. If any changes to the alert definitions are noticed, they are sent for caching. The caching system 232 retrieves latest configuration of alert definitions from the cloud database 254, e.g., Aercloud and stores the definitions in In memory database 218, e.g., Redis.

As illustrated in FIG. 2, configuration 200 illustrates notification sender topology 232 which is responsible for sending out email/sms/push notifications. The notification sender topology 232 picks up alerts message from stream processing pipeline, e.g., Kafka topic, which are published to a queue 234, e.g., Kafka with a topic name based on the transport type, e.g., Email/SMS (short message service)/GCM (Google cloud messaging) etc. as illustrated in FIG. 2. Notification sender client 248 then uses the appropriate transport client and sends the alert message, received from notification sender bolt 246 which receives it from message processing bolt 244, to the recipient user interface, e.g., mobile application user interface 250 and/or web application user interface 252. Different algorithms may be used depending on the kind of device notification generation. Following paragraphs illustrate a few examples of different kinds of algorithms that may be used according to one or more embodiments described herein.

When an alert is derived from multiple data points across a span of time, also known as Stateful Device state Notification generation, an event arrives at queue message consumer e.g., at KafkaSpout, which is sent to the event processor bolt 216, and the event processor bolt 216 puts this event into the most recently used (MRU) Cache. The event processor 216 decodes the data from monitoring device and decorates with additional information. Event Processor 216 gets the configured Alerts for the fleet to which the monitoring device and/or the IoT device with monitoring device installed, belongs. Event processor bolt 216 checks with the memory database 218, e.g., Redis, for this device to get this device's last 5 events (or any configurable number of events), and determines, if the recently arrived event qualifies for a speeding alert (if there are previous events for speeding) or if the recently arrived event qualifies for fuel theft etc. For example, for speeding alert, if speeding is observed for configured number of events or time by checking data from the last few events, a speeding alert is issued. Similarly, for fuel alert, after checking last few events related to fuel level, if there is sudden drop in fuel level in the newly received event, then the alert is sent.

For Stateless Device Notification generation, (e.g., when an alert is issued purely based on current event, e.g., crash event) an event arrives at queue message consumer, e.g., at KafkaSpout, which is sent to the event processor bolt 216, and the event processor bolt 216 puts this device the most recently used (MRU) cache. The event processor 216 decodes the data from monitoring device and decorates with additional information. Event processor 216 gets the configured Alerts for the fleet to which the monitoring device and/or the IoT device with monitoring device installed, belongs. The event processor bolt checks if this event qualifies for notification based on its current state and not based on its previous state.

For non-event based notification generation, e.g., offline alert, DeviceStateCheckerTickerBolt 266 (being a ticker bolt, which is a time triggered task), checks the state of the monitoring device, keeps on checking the state of all the devices at pre-defined intervals, e.g., every hour, every two hours, every day, every week etc. DeviceStateCheckerTickerBolt 266 gets a list of all the devices from the all devices cache, and check against the devices which have reported/sent the payload to cloud storage and retrieval services, e.g., Adapter/AerCloud, from MRU Cache. The devices that had reported before, but have not reported in the past given interval are the candidates for consideration for generating a device offline alert.

Device and events cache topology 232 caches the alert definitions into an in memory cache system, e.g., Redis. This enables efficient retrieval of previous alert definitions. KafkaSpout 234 retrieves the alert definitions from queue and IsAlertsConfigChangeBolt 238 checks if the alert configuration has changed from its previous value. If changed, ReadAlertsConfigBolt 240 will reload the alert configurations from AerCloud alerts and notification data 256 and updates in memory cache 218.

Figure 3:
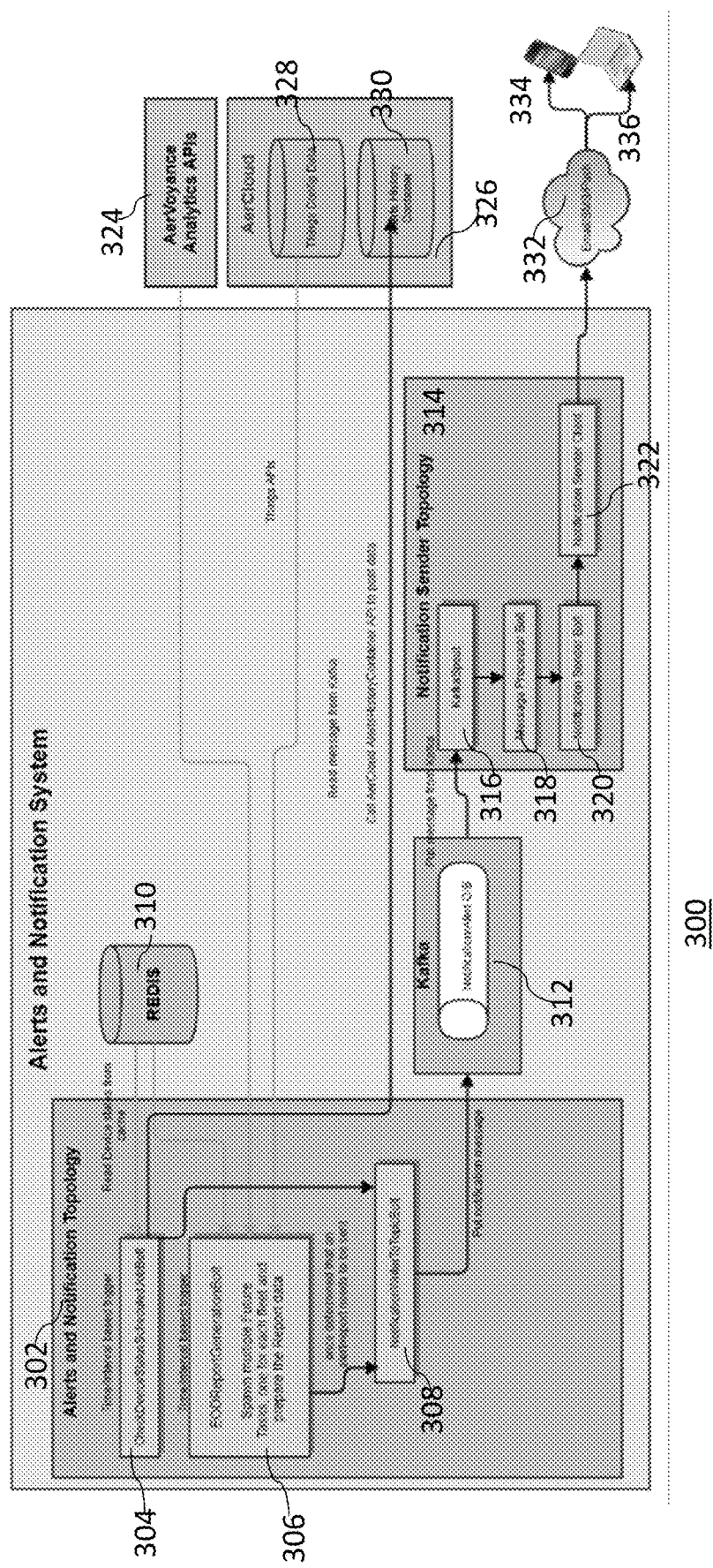
FIG. 3 illustrates exemplary system and process flow for the system and method for or issuing alerts according to an embodiment described herein.

FIG. 3 illustrates exemplary system 300 and process flow for the system and method for issuing time interval based alerts according to an embodiment described herein. As illustrated in FIG. 3, configuration 300 illustrates Time Interval based Job processing flow where cache is refreshed every given time interval, end of the day (EOD), Email summary report etc. In this the topologies are configured with the bolts which are processors/sub components of the system performing specific functions, having time based triggering approach, also known as ticker based approach. For example, a storm processing engine will kick these ticker bolts at the specified time interval or frequency. Cache refresh logic of refreshing the cache at every given time interval is implemented using ticker bolt based approach. EOD Email summary report to be sent every day in the evening is implemented using Ticker bolt based approach.

The time/interval based alerts may be implemented using alert and notification topology 302 which includes time/interval based trigger as illustrated in FIG. 3. The system 300 reads device status from cache, e.g., REDIS 310 and check device status scheduled job bolt 304 check device status. The time/interval based trigger may use EOD report generation bolt 306 to spawn multiple future tasks which may one or more for each fleet and prepare the report data. The EOD report generation bolt 306 receives data from check device status scheduled job bolt 304 along with other sources including any one or more of: REDIS 310, device analytics system 324, e.g. AerVoyance analytics APIs, and one or more databases such as things config data 328, which includes provisioning information about the monitoring device, model, vehicle, fleet etc., and alerts history container/database 330, to determine if an alert or a report should be generated and sent.

Device alerts data cache holds alert events reported by the monitoring device. A cache is maintained for faster lookup by other components in the system. The device alerts data cache holds the events that are under "fleetAlerts" container. Alerts Config cache contains the alert definitions like speed threshold, battery percentage etc. which are fleet service provider/fleet provider FSP/FP specific, for example, Vehicle config, Places config, Drivers config, Notifications config, fleet owner (FO) to fleet service provider (FSP) Mapping cache, Fleet provider information cache. All the cached data is used by the processing components, e.g., different bolts, to efficiently lookup configuration data or derived state data, also known as calculated state data which includes events stored in the cache system that is looked up later to determine alerts. An example would be to lookup alert definition when the monitoring device sends data. This lookup may also be checked against Redis/In memory database 310 for higher performance.

Once it is determined by the EOD report generation bolt 306 that an alert or a report needs to be sent, a notification is written to a topic bolt 308 which then puts notification message through Notification/Alert O/B pipeline 312, e.g., Kafka, RabbitMQ etc. The notification sender topology 314 pulls the message from Notification/Alert O/B pipeline and processes it through a queue message consumer 316, e.g., Kafka spout, which then sends the message to a message processor bolt 318. The message processor bolt 318 send the message to notification sender bolt 320, which sends it to a notification sender client 322. The message then may be emailed, SMSed or pushed as alerts and/or notifications 332 to a user interface which may include a mobile device 334 or a computer terminal 336 including a lap top.

Since the system and process described above makes use of the time/interval based data processing, it may be used for issuing alerts that are time/interval based. For example, if a user or a fleet operator wants to get alerts when vehicle is Offline (vehicle is either stolen or not reporting) for longer than a predetermined duration of time, for example, if the asset/device/vehicle does not report any data after 15 min, a Unit offline alert may be provided as a configurable threshold using function, e.g., ">x hrs" (e.g., 60 hrs.) which is an exemplary configuration condition stating that if the asset/device/vehicle has not reported data for x hours, send an alert: "offline-not reporting". The reported data may simply be a heartbeat from the device. Alternatively, this threshold may not be configurable by the user and the threshold value may be pre-defined. An alert may be sent at the first offline threshold value and then send reminder alert at second threshold value, e.g., every 6 hours, 12 hours, 24 hours etc., and may be reset and sent restore alert when powered ON and may be classified based upon predetermined value dependent severity or predefined severity for certain conditions, for example, critical. In addition, a reset may be at a user-configurable speed and units, e.g., km/h or m/h, as chosen by the user or the fleet operator.

Figure 4:
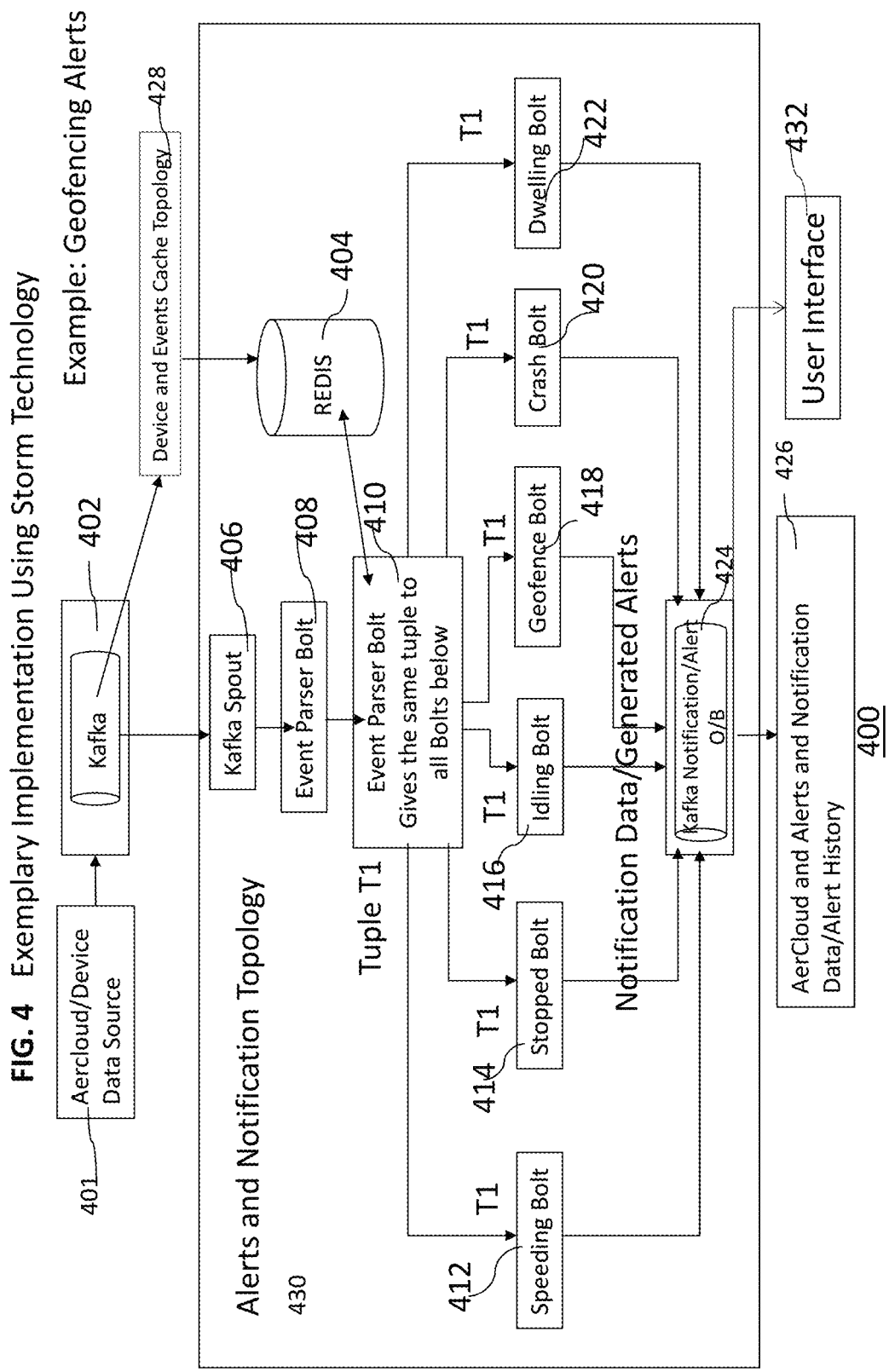
FIG. 4 illustrates exemplary system and process flow for the system and method for issuing alerts according to an embodiment described herein.

FIG. 4 illustrates exemplary system and process flow for the system and method for issuing alerts regarding geofencing and driver behavior using Storm technology as exemplary method of implementation according to an embodiment described herein. Although the exemplary implementation shown here uses Storm technology, other technologies may also be used for implementation.

FIG. 4 illustrates system 400 and computer implemented method for issuing alerts including receiving device information for one or more mobile devices; sorting the received device information based on pre-determined criteria; evaluating the sorted device information to determine if the device information satisfies a specified condition; and issuing an alert as a result of the determination.

The system 400 includes various data streaming and pipelining components including any one or more of: queue, e.g., Kafka, RabbitMQ etc. 402, queue message consumer 406, e.g., Kafka Spout, event parser bolt 408 and various bolts such as speeding bolt, 412, stopped bolt 414, idling bolt 416, geofence bolt 418, crash bolt 420, dwelling bolt 422 etc. for processing various data. Once the event data is received by the event parser bolt 408 via various streaming and pipeline components described above, it gives the same tuple or sequence of immutable data to all the bolts described above and illustrated in FIG. 4.

As illustrated in FIG. 4, design details for the method for use cases described herein may include device payloads coming from fleet adapter to AerCloud (database) flow: AerCloud 401 writes device payload message to device data topics, e.g., AerVoyance alerts and notification topics e.g., AC_ANA_APP which is an exemplary topic name on Kafka 402. This is similar to data coming from AerCloud 206 to AerVoyance 208 and any data change from AerCloud 254 to 208 as illustrated in FIG. 2 and described in the description accompanying FIG. 2.

Device and Events cache Topology 428 caches the alert definitions into an in memory cache system 404, e.g., Redis. This enables efficient retrieval of previous alert definitions. Similar to Device and Events cache Topology 232 illustrated in FIG. 2, this topology 428 also retrieves the alert definitions from queue and checks if the alert configuration has changed from its previous value. If changed, it will reload the alert configurations from AerCloud alerts and notification data and updates in memory cache 404.

AlertsAndNotificationTopology 430, a component that identifies the Alert conditions, pulls each message from the topic 402, writes it to the device cache in memory 404, e.g., REDIS, and then reads given number of last device states (payloads) from cache 404. AlertsAndNotificationTopology 430 is similar to the AlertsAndNotificationTopology 212 illustrated in FIG. 2 and described in detail in the description accompanying FIG. 2.

The event parser bolt 408 gives that device payload list to each of the bolts, e.g., idling bolt 416 for determining Idling, speeding bolt 412 for determining speeding, stopped bolt 414 for determining stopping, crash bolt 420 for determining a crash, geofence bolt 418 for determining crossing of geofence boundaries, dwelling bolt 422 for determining dwell time etc. These bolts are run in parallel. Each of the above bolts evaluates its own condition, e.g. speeding, idling etc., and then writes corresponding alert message to the AERTRAK_NOTIFICATION_OUTBOUND1, e.g., kafka topic 424. AERTRAK_NOTIFICATION_OUTBOUND1 is a topic name given in queue, e.g., kafka. When the alert is identified by the component, e.g., specific bolt as described above, that alert is sent to this topic and notification sender will consume or read it from this topic and also write this alert's data to a database, e.g., AerCloud, alert history container 426 using API, e.g., AerCloud API. Regardless whether alert is generated by time based or data from monitoring device, the final output is stored in alert history.

Monitoring service/system alerts setup/vehicles/places/ notification etc., e.g., AerTrak alerts setup/vehicles/places/ notification, configuration change processing flow: Whenever any SCL/device configuration data changes in the database 426, e.g., AerCloud, as device configuration data is stored in the database, e.g., AerCloud, AerCloud writes device SCL change/update message to AC_ANA_SCL topic (e.g., on Kafka), where AC_ANA_SCL is the queue topic name for publishing device details such as alert definition etc. ReloadFleetCacheAfterUpdateTopology which is a system component responsible for maintaining the in memory database of devices, fleet etc., pulls each message from the above topic, reads the latest SCL configuration from the database 401, e.g., AerCloud, and refreshes cache 404, e.g., REDIS. The alert history of the generated alerts is stored in the database, e.g., AerCloud, alert history container 426 as alerts and notification data. The message then may be emailed, SMSed or pushed as alerts and/or notifications to a user interface 432 which may include a mobile device or a computer terminal including a lap top.

The following examples for issuing notifications/alerts may be implemented by using the system and method described above and illustrated in FIG. 4.

If a user or the fleet operator wants to get notified when a crash happened to a vehicle, it may be provided as a configurable threshold, for example, using function "On Device>xxx m/s/s—from Even 20 or UNACK". Monitoring device is set with this configuration to report impacts. The impact is reported to cloud database in the form of an event code which is 20, meaning Impact detected—Unack, where the threshold value may be, for example, 5 g deceleration. This is an example deceleration configuration which is equivalent to 49 m/s$^2$, other deceleration values may be configures by the user, e.g., the fleet operator. When the vehicle/device decelerates beyond this provided value and deceleration duration is within a configured impact time, this event is considered as impact. Alternatively, this threshold may not be configurable by the user and the threshold value may be pre-defined. This alert may be sent only once at the moment of the deceleration event and may be classified based upon predetermined value dependent severity, for example, critical. This alert may be generated from the monitoring device. Alert may reset when vehicle speed>0 and ignition is back "On" after the event.

If a user or the fleet operator wants to get alert when there is an excessive fuel level drop between Ignition ON readings, it may be provided as a configurable threshold, for example, using function "Sudden fuel loss >X (25) %". The alert may be sent only once when passing the threshold of x (default=25) % fuel drop and may be classified based upon predetermined value dependent severity, for example, warning.

If a user or the fleet operator wants to get alert when specific vehicle arrives (enters) or departs (leaves) a specific geofence/place, geofence In/Out alert may be provided as a configurable threshold using function "In/Out of specific Place/Geofence", which may be sent upon crossing the boundary, for example, sent once when entering and/or leaving the geofence and may be reset and sent as an alert once again if leaving the geofence. This alert may be classified as critical/warning/information based upon severity of the situation which depends on a predetermined or a predefined value for each severity level.

If a user or the fleet operator wants to get alert when a vehicle is stopped for example, at any location exception), for too long, a stop time alert may be provided as a configurable threshold using function "at any location >x min (60)". The alert may be sent once when passing the time threshold and the repeat at a predetermined time interval, e.g., every, 30 minutes, every 60 minutes etc., except when in a particular predetermined geofence, e.g., Depot geofence. For example, a Depot geofence may be set as an exception to this alert such that if an asset is stopped at specific places/locations (except for DEPOT) with Ignition ON or OFF. The alert conditions may also include exceptions based on schedules, night time, etc. and may reset when certain conditions are reached, e.g., when speeds>15 cm/h. This alert may be classified as critical/warning/information based upon severity of the situation which depends on a predetermined or a predefined value for each severity level.

If the user or the fleet operator wants to get alert when a vehicle is idle, for example, when the vehicle is not moving with the ignition ON. GPS movement may be restricted to a limited radius area, for example, 5-10 meters, some movement within the specified distance may also be considered idle time. In addition, a device may report a GPS location which is adjacent to the previous one, due to GPS drift. In such cases, the fleet operator may decide to provide a radius of few meters, where this value may be configurable by either the user or the fleet operator or may be provided in the application. An Idle time alert may be provided as a configurable threshold using function "at any location >x min (60)". The alert may be sent once when the time threshold is crossed as defined in the alert condition and then repeat at a predetermined time interval, e.g., every 30 minutes, every 60 minutes etc., except when in a particular predetermined geofence, e.g., depot geofence. For example, a depot geofence may be set as an exception to this alert such that if the asset, in this case, the vehicle, has stopped at specific places (except for DEPOT) with Ignition ON or OFF. The alert conditions may also include exceptions based on schedules, night time, etc. and may reset when specific conditions are reached, e.g., speeds>15 cm/h. This alert may be classified as critical/warning/information based upon severity of the situation which depends on a predetermined or a predefined value for each severity level.

If the user or the fleet operator wants to get alert when a vehicle/asset is too long in a specific geofence, for example, when the vehicle stays too long inside a place, a dwelling time alert may be provided as a configurable duration of time threshold using function, e.g., "In radius for @ Time (4 hours)", where duration of time value may be configured by the user or the fleet operator. Geofence dwelling updates may be sent once when passing the time threshold inside a geofence/place, may be reset and sent as an alert once again if leaving the geofence and may be classified as for example, information. In addition, a reset may be at a user-configurable speed and units, e.g., km/h or m/h, as chosen by the user or the fleet operator.

Figure 5:
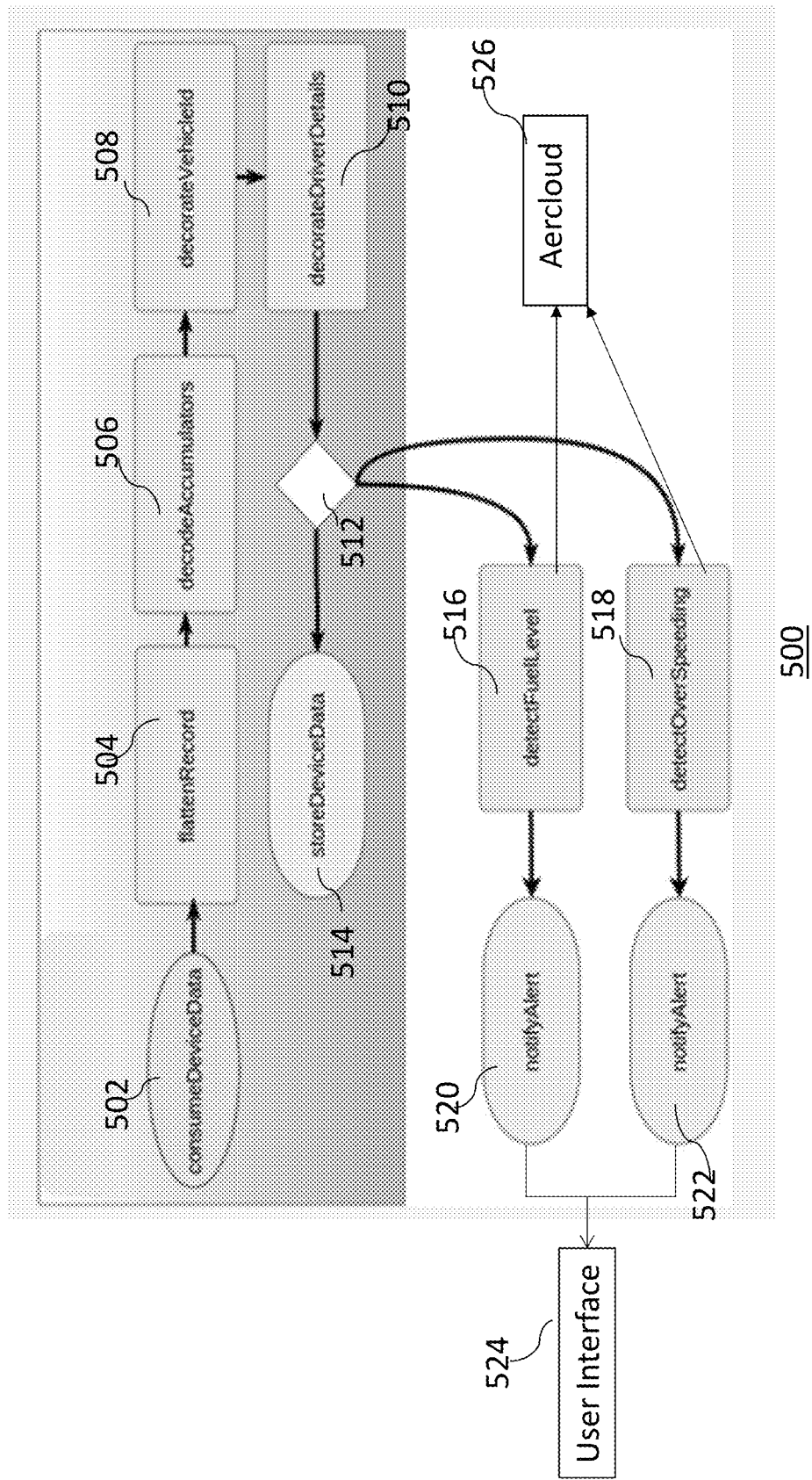
FIG. 5 illustrates exemplary system and process flow for the system and method for issuing alerts according to an embodiment described herein.

FIG. 5 illustrates exemplary system and process flow for the system and method for issuing alerts regarding geofencing and driver behavior using Flink technology according to an embodiment described herein. Although the exemplary implementation shown here uses Flink technology, other technologies may also be used for implementation.

As illustrated in FIG. 5, a simplified version of OBD stream processing code for example, using Flink technology, executed by the method and system 500, may include:

```
config: { ... }
scripts: { ... }
operators: [
    { name: consumeDeviceData, type: ConsumeRecord,
    properties = {...} },
``` where device data is received at 502, the data is flattened to transform multiple levels of hierarchy of information into a single level, via step 504, and accumulators are decoded at step 506. Accumulators are placeholders designed into the data payload, which can store any arbitrary value. For example Accumulator 8 stores the ignition status value of the device/vehicle in hex. This hexadecimal value is decoded in this step. The decoded data is then decorated by adding more information called as data decoration, e.g., vehicle ID, via step 508, and/or driver details via step 510 as follows:

```
{ name: flattenRecord, type: SelectFields, properties = {...}
},
{ name: decodeAccumulators, type: ExecuteScript,
properties = {...} },
{ name: decorateVehicleId, type: LookupTable, properties =
{...} },
{ name: decorateVehicleId, type: LookupTable, properties =
{...} },
...
]
flows: [ {
    flow: [
        { type: apply, operator: consumeDeviceData }
        { type: apply, operator: flatten Record }
```

-continued

```
        { type: apply, operator: decodeAccumulators }
        { type: apply, operator: decorate VehicleId }
        { type: apply, operator: decorateDriverDetails }
        { type: multicast, elements: [
            { type: pipeline, elements: [
                { type: apply, operator:
                storeDeviceData }
        ] },
```

The sorted and decorated device data may then be stored via step 514 through parallel execution branch 512 of the flow which sends the processed events to, for example, detect fuel level 516 and detect over speeding 518 in parallel for efficiency higher than that for non-parallel or serial execution. The alert notifications are the generated as notify alert 520 and 522. These generated messages may then be emailed, SMSed or pushed as alerts and/or notifications to a user interface 524 which may include a mobile device or a computer terminal including a lap top. The alert history of the generated alerts is stored in the database, e.g., AerCloud, alert history container 526 as alerts and notification data.

If the user or the fleet operator wants to get an alert when there is an excessive fuel level drop between Ignition ON readings, it may be provided as a configurable threshold, for example, using function "Sudden fuel loss >X (25) %". The alert may be sent only once when passing the threshold of x (default=25) % fuel drop and may be classified based upon predetermined value dependent severity, for example, a warning, as follows:

```
{ type: pipeline, elements: [
    { type: apply, operator:
    detectFuelLevel }
    { type: apply, operator: notifyAlert }
] },
```

If a user or the fleet operator wants to setup a speeding alert when the driver exceeds speed threshold (highway) for a period of time, it may be provided as a configurable threshold, for example, using function ">X kph (80) for @ period of time (1 minute)".

```
{ type: pipeline, elements: [
    { type: apply, operator:
    detectOverSpeeding }
    { type: apply, operator: notifyAlert }
    ] }
    ]}
]
}]
```

Figure 6:
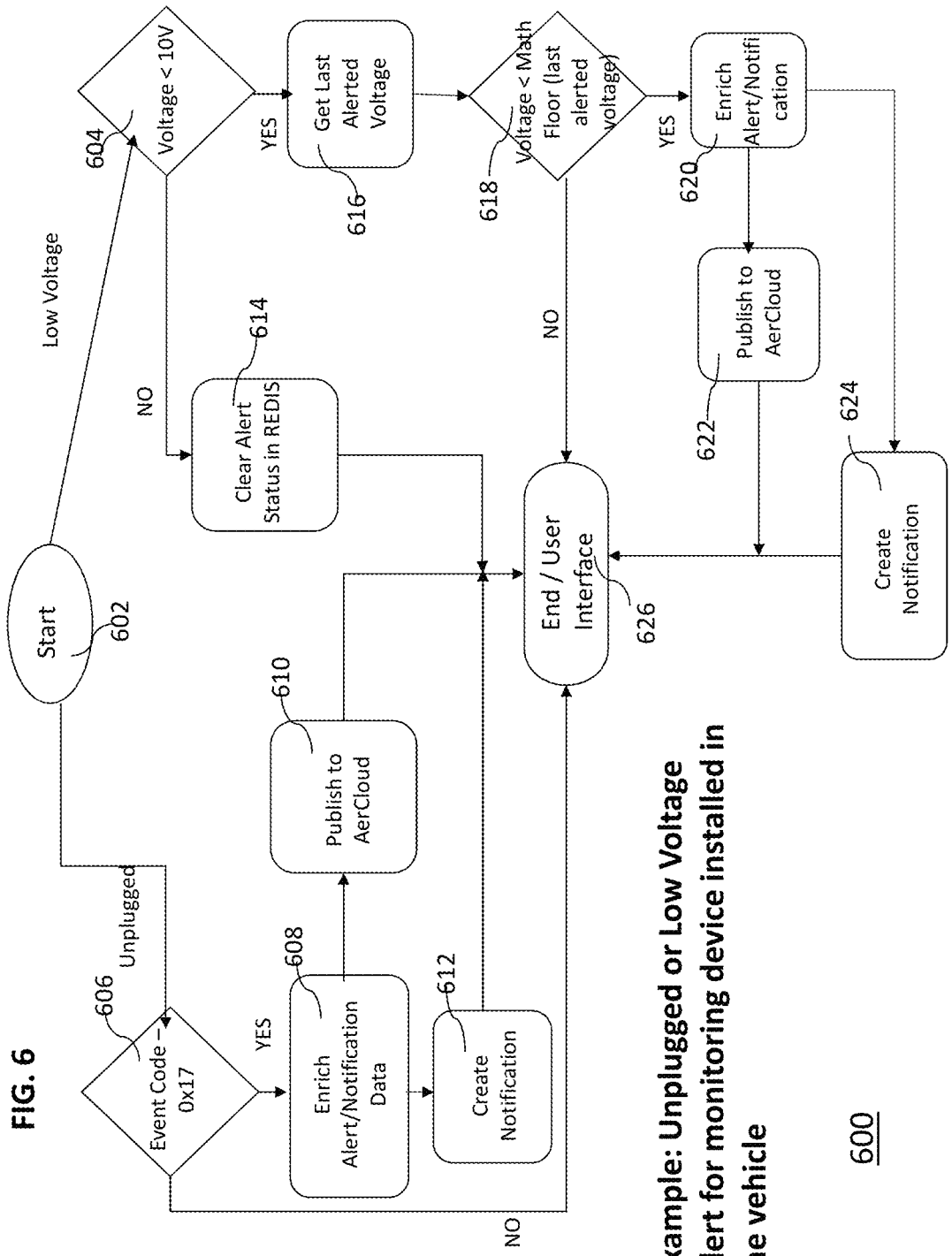
FIG. 6 illustrates exemplary system and process flow for the system and method for issuing alerts according to an embodiment described herein.

FIG. 6 illustrates exemplary system 600 and process flow for the system and method for or issuing alerts regarding unplugged monitoring device or low voltage (battery level) alert according to embodiments described herein.

When the monitoring device installed in the vehicle is unplugged, the no power event is sent to cloud 610 via step 606. Alternatively, the no power event may also be detected when any one or more of the following conditions occur: (1) No voltage data is received (2) No GPS data is received in a predetermined time interval, (3) Device has not reported any status data for more than a predetermined time interval, (4) If device is set to sleep for a predetermined duration of time, e.g., 5 days, 10 days etc., a minimum of 24 hour beats are received from device. For example, when a device is set to sleep for long duration of time, it will send heart beat event data to the cloud 610 in every 24 hrs, or at a pre-defined interval, e.g., every 8 hours, every 12 hours etc. This can help to determine if the device is really unplugged or it is just sending no-power event due to a large sleep.

The alert/notification data is enriched, e.g., by adding alert definition and notification recipient's details to the data that is being processed, via step 608 and sent to the cloud services, including a database 610, e.g., AerCloud, and a notification or an alert is created via step 612 and is sent to the user interface 626.

The process described above allows the user and/or fleet operator to receive alerts when the monitoring device installed in the vehicle is unplugged, tampered or disconnected from the vehicle, for example, when the monitoring device has been disconnected from the vehicle, an unplugged monitoring or tracking device alert may be provided as a configurable threshold using a function, e.g., "when devices senses no power event is sent to Cloud". Alternatively, this threshold may not be configurable by the user and the threshold value may be pre-defined. Device may be considered unplugged when any one or more of the following conditions occur: (1) No voltage data is received in Aercloud—alerts send immediately, (2) No GPS data is received in a predetermined time interval, e.g., 24 hours, in database, e.g., Aercloud, (3) Device has not reported any status data for more than a predetermined time interval, e.g., 24 hours, to database 610, e.g., AerCloud, (4) If device is set to sleep for a predetermined duration of time, e.g., 5 days, 10 days etc., a minimum of 24 hour beats are received from device and may be classified based upon predetermined value dependent severity or predefined severity for certain conditions, for example, critical. For example, when a device is set to sleep for long duration of time, it will send heart beat event data to the cloud in every 24 hrs, or at a pre-defined interval, e.g., every 8 hours, every 12 hours etc. This can help to determine if the device is really unplugged or its just sending no-power event due to a large sleep.

Additionally or alternatively, the system and method may also provide alerts/notification when the battery voltage of the monitoring device is lower than expected. When voltage level drops below a specified threshold, the system looks up the last alerted voltage via step 616, and the new voltage reading is compared with the last alerted voltage via step 618. If the new voltage reading is less than the last alerted voltage, the alert/notification data is enriched, e.g., by adding alert definition and notification recipients details to the data that is being processed, via step 620 and sent to the cloud services, including a database 610, e.g., AerCloud and a notification or an alert is created via step 624 and is sent to the user interface 626.

The process described above allows the user and/or fleet operator to receive alerts when battery voltage of the monitoring device installed in the vehicle is lower than expected, for example, an alert may be triggered when after averaging a predetermined number of payloads, Battery Voltage Low-Ignition ON. This alert may be provided with a configurable threshold using function, e.g., "<Average 10 volts Speed>0 Ignition=ON". Alternatively, this threshold may not be configurable by the user and the threshold value may be pre-defined. An alert is sent when voltage drops below the predetermined or predefined voltage threshold, e.g., 10 volts, once if the reading continuously stays under, e.g., 10 volts, and then may repeat at predetermined time interval, or at predetermined voltage level drop, e.g., for every 1 volt drop (alert at 10 volts, 9 volts, 8 volts, 7 volts, . . . etc.), and may be reset by clearing alert status via step 614, if the voltage goes above predetermined or predefined voltage threshold, e.g., 10 volts. Other voltage levels, e.g., 5 volts or 15 volts etc. may also be defined or configured.

The alert may be classified based upon predetermined value dependent severity or predefined severity for certain conditions, for example, warning. In an embodiment, the monitoring devices may be powered by a battery and the system and method may detect that the power supply is removed and generate alert as a result, e.g., generate an unplug alert. Such an alert may include a device generated event ingested or sent over the cloud services including a database 610, e.g., in Aercloud, and triggered form the application. This can also be on a physical server that is remote. The device generated events are generated by the monitoring devices when the device is smart enough to identify some alert conditions like low battery event. The cloud service may intercept that event and may generate an alert with the data obtained from that device. Once the monitoring device is disconnected from power, "device unplugged" event 606 may be sent from the device, if a backup battery is provided to send the event to cloud database 610.

FIG. 7A illustrates exemplary system and process flow for the system and method for issuing tow alerts according to an embodiment described herein.

If a user or the fleet operator wants to get alerts when the vehicle is being towed, for example, an alert may be triggered when the ignition is off and latitude and longitude of the monitoring device, and hence the vehicle 702, are changing i.e. vehicle is moving (for example, check payloads for a specified or predetermined period of time, e.g., 30 seconds, 1 minute, 2 minutes etc.), and the speed of the vehicle is above a specified or predetermined speed, e.g., more than 224 cm/s (Approx. 5 miles per hour, 7 miles per hour etc.), raising a tow alert. Thus, the issuance of towing alert may include checking the device payload for its ignition state, latitude and longitude, speed and a predetermined eventcode for occurrence certain events. For example, the eventcode may be one of the following: ('1', '2', '3', '4', '6', 'a' or '14'). For example 'a' may be configured to mean regular location update event. The event codes can be any number, but they have to be configured on the monitoring device by the application provider or in some cases, the user.

The above information is sent to a gateway 704 as device data which then send it to a queue 706 which is then sent to tow alert/notification pipeline 708. Queue is a component that buffers all the data sent to it and can supply that data to other consumer programs, e.g., Kafka, RabbitMQ etc. The device data is then stored in a database, e.g., AerCloud, and may be used for further analytics and also displaying in user interface/mobile etc. The serving web service 712 which is an application/program that is responsible for interacting with one or more databases and providing alert and other data to a user interface, sends the message to as email, SMS or push notification to a user interface which may include a mobile device 714 or a computer terminal 716 including laptop.

In an embodiment, a tow alert may be enabled at account level, meaning tow alert may be enabled for all the vehicle belonging to a particular account and/or fleet, whereas secure parking may be enabled on per vehicle basis based on user input which may include pressing a "secure parking" button in the vehicle or activating "secure parking" mode via mobile application.

Figure 7B:
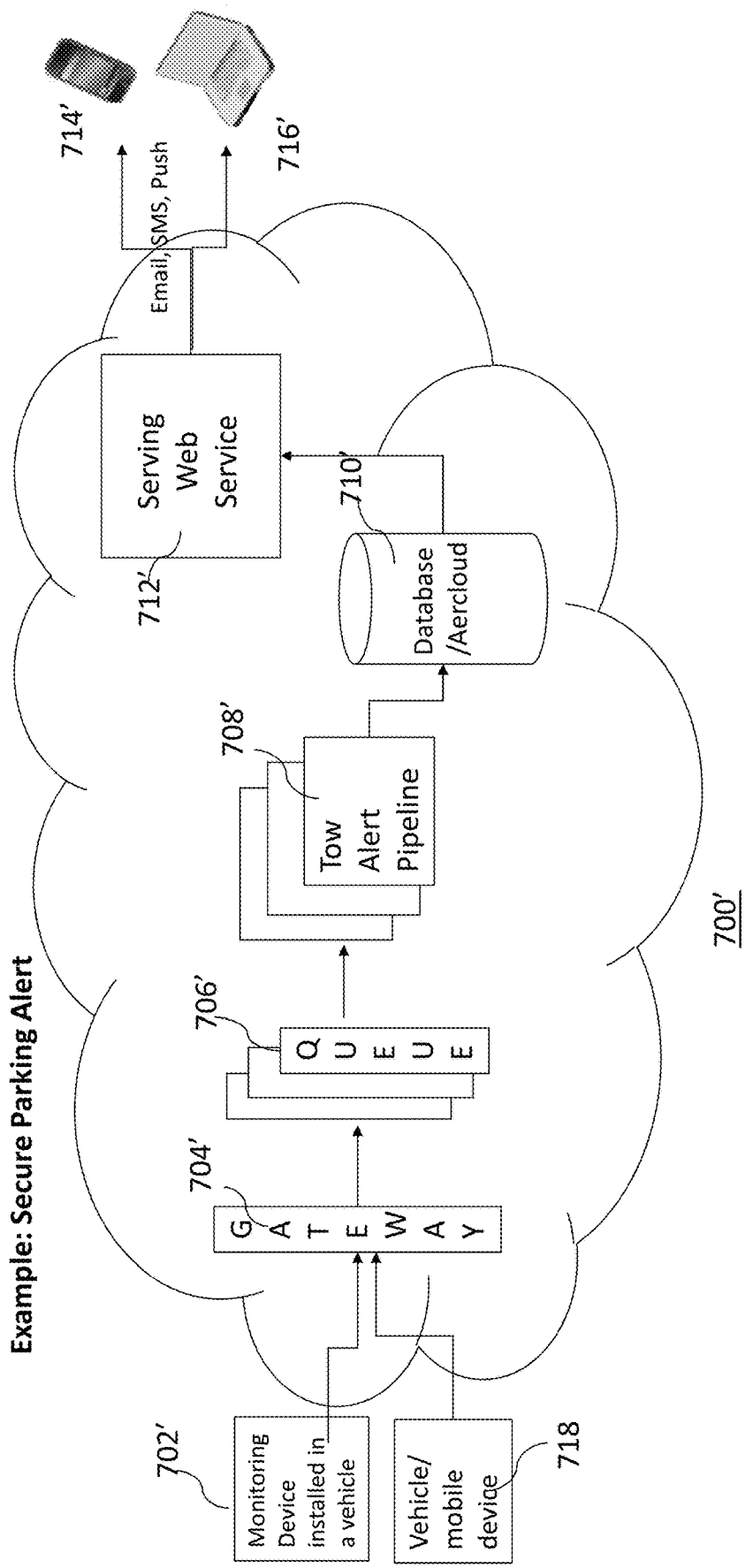

FIG. 7B illustrates exemplary system and process flow for the system and method for issuing secure parking alerts according to an embodiment described herein. Although "tow alert" and "secure parking" share a common concept, there are two differences: 1. along with data received from the monitoring device, the data is also received from the vehicle or user's mobile device if the secure park is enabled by the user involving two types of data input and 2. The "tow alert" may be activated for all the vehicles belonging to an account whereas "secure parking" may be activated for individual vehicles by the user either by clicking the button for "secure parking" in the vehicle or by activating "secure parking" mode using mobile application as described above.

If a user or the fleet operator wants to get alerts when the vehicle is moving or being moved without authorization, for example, an alert may be triggered when if a user parks his vehicle and his vehicle is moved from a parked location, when they park the vehicle and enable "secure park" mode using one of the two methods as follows. The "secure parking" alert/notification may be enabled on per vehicle basis based on user input which may include pressing a "secure parking" button in the vehicle or activating "secure parking" mode via mobile application.

The method and system will identify if the vehicle moves out of a configured radius and generate alert based on the threshold radius that is provided as pre-defined threshold, or as a predetermined threshold by the user or the fleet operator. If 'secured parking' is enabled for the device, and current location is outside of the pre-determined units outside of the radius determined for the location at parking, the method and system issues an alert.

For example, an alert may be triggered when the ignition is off and latitude and longitude of the monitoring device and hence the vehicle 702' are changing i.e. vehicle is moving (for example, check payloads for a specified or predetermined period of time, e.g., 30 seconds, 1 minute, 2 minutes etc.), and the speed of the vehicle is above a specified or predetermined speed, e.g., more than 224 cm/s (Approx. 5 miles per hour), more than 7 miles per hour etc., raising a tow alert. Thus, the issuance of towing alert may include checking the device payload for its ignition state, latitude and longitude, speed and a predetermined eventcode for occurrence certain events. For example, the eventcode may be one of the following: ('1', '2', '3', '4', '6', 'a' or '14'). For example 'a' may be configured to mean regular location update event. The event codes can be any number, but they have to be configured on the monitoring device by the application provider or in some cases, the user.

Similar to tow alert, the above information along with the user input for enabling "secure parking" is sent to a gateway 704' as device data which then send it to a queue 706' which is then sent to tow alert/notification pipeline 708'. Queue is a component that buffers all the data sent to it and can supply that data to other consumer programs, e.g., Kafka, RabbitMQ etc. The device data is then stored in a database, e.g., AerCloud, and may be used for further analytics and also displaying in user interface/mobile etc. The serving web service 712 which is an application/program that is responsible for interacting with one or more databases and providing alert and other data to a user interface, sends the message to as email, SMS or push notification to a user interface which may include a mobile device 714' or a computer terminal 716' including lap top.

Figure 8A:
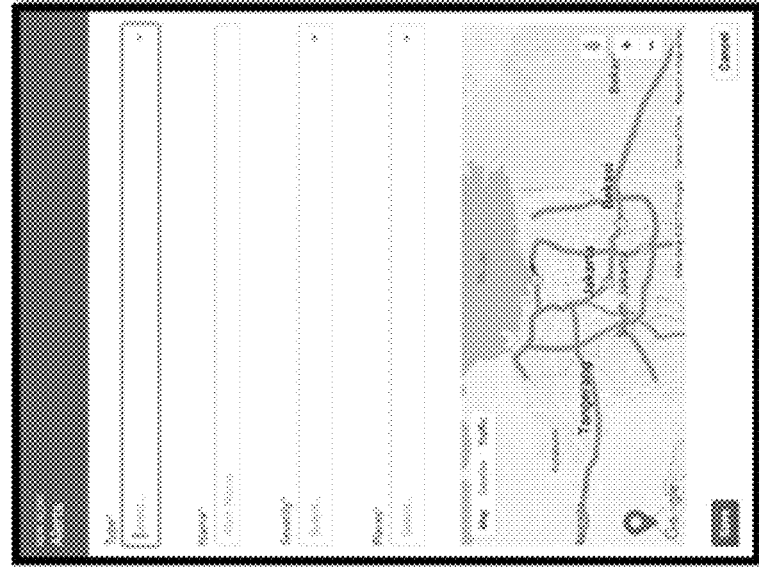
FIGS. 8A-C illustrate exemplary user interface for using the system and method for issuing alerts according to an embodiment described herein.
Figure 8B:
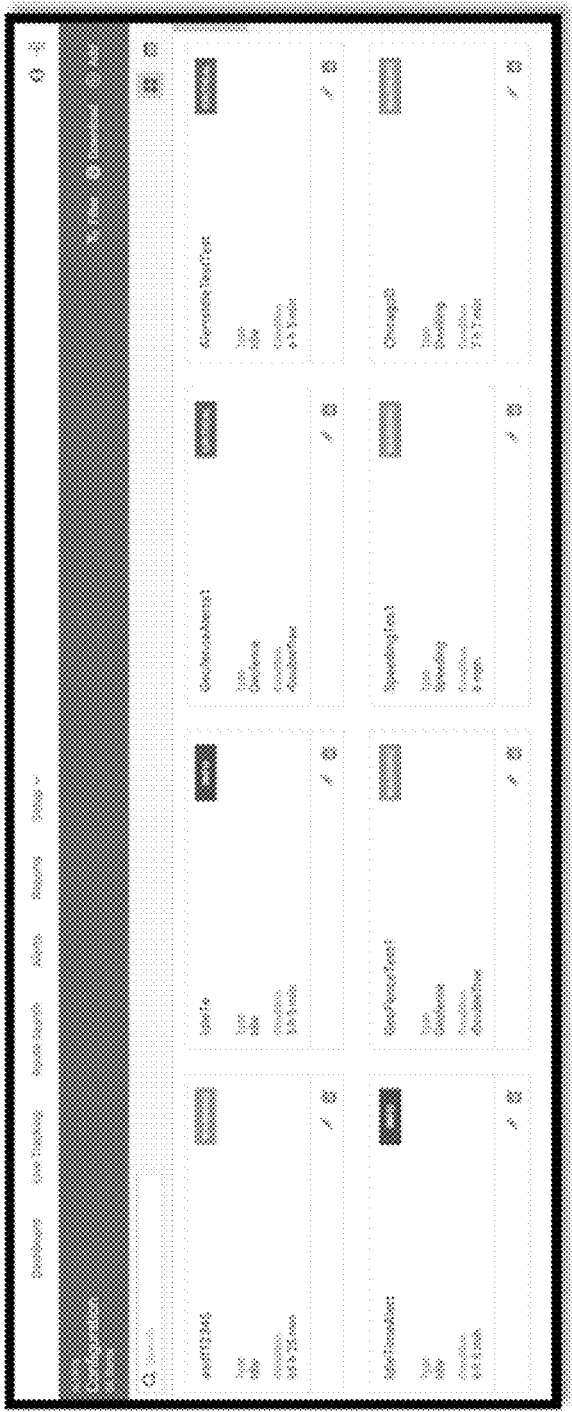
Figure 8C:

FIGS. 8A-C illustrate exemplary user interface for using the system and method for issuing alerts regarding geofencing and driver behavior according to an embodiment described herein.

FIG. 8A illustrates an exemplary user interface screen for adding a new alert and may include a mobile interface.

As illustrated by FIG. 8A, a new alert may be added by selecting an alert type from a list of available alerts or notifications. For example, Stop time alert: when the vehicle has stopped for more than a certain duration of time outside of known place or exceptions; Dwell Time alert: when the vehicle is waiting for more than a certain duration of time inside a known place; Idle Time alert: when the vehicle is not moving but the engine is ON; Speeding alert: when the vehicle is moving/being driven above a predetermined speed limit; Offline alert: when the vehicle is in offline status for more than a certain duration of time; Crash alert: when the vehicle is severely impacted which may be determined by deceleration of the vehicle above a pre-defined or predetermined threshold deceleration; Fuel Drop alert: when fuel level in the vehicle has dropped below a certain threshold; Unplugged Device alert: when the monitoring device in the vehicle is tampered or removed; Tow alert: when the vehicle is being towed; and Secure Parking alert: when vehicle is moving without authorization.

The user or the fleet operator or a person responsible for setting alerts/notifications may then select conditions applicable for each newly added alert or the alert to be added, e.g. time, duration, voltage, speed, place, ignition status, radius for geofence, fuel level, power level/battery status, monitoring device status, vehicle deceleration or a combination thereof. If Geofence or Dwell time Alert is selected, the location of the place may be displayed on the map.

FIG. 8B illustrates an exemplary user interface screen for setting up alerts. The user interface may display a list of existing alerts, and may allow users to search, view, edit and delete the alerts or alert details. For example, editing geofence or editing conditions for the alerts, or editing conditions for levels of severity. It may also allow users to define new alerts. In an embodiment, default values for threshold conditions may be provided by the application as pre-defined conditions which may or may not be editable by the user or the fleet operator or the person responsible for setting alerts.

FIG. 8C illustrates an exemplary user interface screen for viewing alerts and may include level of severity of alerts which may be color coded.

Figure 9:
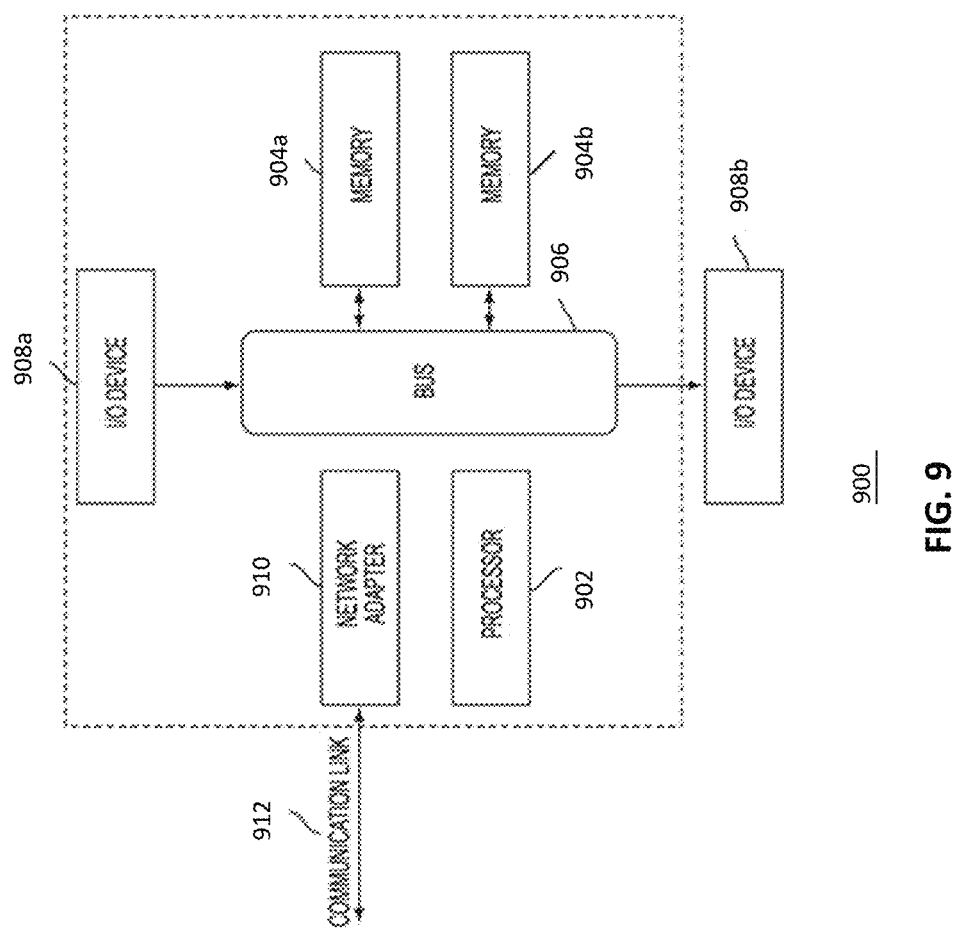
FIG. 9 illustrates a data processing system 900 suitable for storing the computer program product and/or executing program code relating to issuing alerts in accordance with an embodiment described herein.

FIG. 9 illustrates a data processing system 900 suitable for storing the computer program product and/or executing program code in accordance with an embodiment of the present invention. The data processing system 900 includes a processor 902 coupled to memory elements 904*a-b* through a system bus 906. In other embodiments, the data processing system 900 may include more than one processor and each processor may be coupled directly or indirectly to one or more memory elements through a system bus.

Memory elements 904*a-b* can include local memory employed during actual execution of the program code, bulk storage, and cache memories that provide temporary storage of at least some program code in order to reduce the number of times the code must be retrieved from bulk storage during execution. As shown, input/output or I/O devices 908*a-b* (including, but not limited to, keyboards, displays, pointing devices, etc.) are coupled to the data processing system 900. I/O devices 808*a-b* may be coupled to the data processing system 900 directly or indirectly through intervening I/O controllers (not shown).

In FIG. 9, a network adapter 910 is coupled to the data processing system 902 to enable data processing system 902 to become coupled to other data processing systems or remote printers or storage devices through communication link 912. Communication link 912 can be a private or public network. Modems, cable modems, and Ethernet cards are just a few of the currently available types of network adapters.

Embodiments of the process described herein can take the form of an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "communication" is understood to include various methods of connecting any type of computing or communications devices, servers, clusters of servers, using wired and/or wireless or cellular communications networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4 G LTE, 5 G, wireless local area network (WIFI), Ethernet etc.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for issuing alerts regarding device behavior of mobile devices; the method comprising:
    receiving device information for one or more mobile devices;
    sorting the received device information based on pre-determined criteria;
    evaluating the sorted device information to determine if the device information satisfies a specified condition for issuing alerts regarding device behavior,
        wherein the alerts include any of: stop time alert, dwell time alert, offline alert, crash alert, fuel drop alert, unplugged device alert, tow alert, secure parking alert, or a combination thereof; and
        wherein the specified condition for issuing an alert regarding device behavior comprises any of: time, duration, voltage, speed, place, ignition status, radius for geofence, fuel level, power level/battery status, monitoring device status, vehicle deceleration, or a combination thereof;
    classifying an alert as any one of: critical, warning or information, based upon a pre-determined value for each level; and
    issuing the alert based on result of the determination and classification for the one or more mobile devices regarding device behavior.

2. The computer-implemented method of claim 1, wherein the one or more mobile devices further comprise any one or more of: an IoT device enabled for connectivity and a monitoring device installed in the IoT device.

3. The computer-implemented method of claim 2, wherein device information for the one or more mobile devices comprises any of: a device identifier, location of the device, duration of time spent by the device at a specific location, speed of the device, acceleration/deceleration of the device, ignition status of the device, fuel level of the device, battery level of the device, plugged/unplugged status of the device and duration of time for which no device information is received, or a combination thereof.

4. The computer-implemented method of claim 1, wherein sorting the received device information based on pre-determined criteria further comprises separating one or more device data values based on data fields.

5. The computer-implemented method of claim 1, wherein evaluating the sorted device information to determine if the device information satisfies the specified condition further comprises comparing value in a specified data field to a threshold value specified for that data field using a pre-determined criteria for satisfying that condition.

6. The computer-implemented method of claim 1, wherein issuing the alert based on the result of determination comprises sending email, SMS or push notification to an user interface.

7. The computer-implemented method of claim 1, wherein issuing the alert based on the result of determination further comprises indicating severity of alert based on pre-determined criteria.

8. The computer-implemented method of claim 7, wherein severity of alert is indicated by using different color for each level of severity.

9. The computer-implemented method of claim 1, further comprises providing an user interface to specify conditions.

10. The computer-implemented method of claim 6, wherein the user interface includes any one or more of: a mobile device, a computer terminal and a lap top.

11. A system for issuing alerts regarding device behavior of mobile devices, the system comprising at least one IoT device, a data processing system and a user interface, wherein the data processing system further comprises:
- a storage database, wherein the storage database receives device information for one or more mobile devices;
- an analytics engine, wherein the analytics engine sorts the received device information based on pre-determined criteria;
- a rules engine, wherein the rules engine
- evaluates the sorted device information to determine if the device information satisfies a specified condition for issuing alerts regarding device behavior,
  - wherein the alerts include any of: stop time alert, dwell time alert, offline alert, crash alert, fuel drop alert, unplugged device alert, tow alert, secure parking alert, or a combination thereof; and
  - wherein the specified condition for issuing alerts regarding device behavior comprises any of: time, duration, voltage, speed, place, ignition status, radius for geofence, fuel level, power level/battery status, monitoring device status, vehicle deceleration, or a combination thereof;
- classifies an alert as any one of: critical, warning or information, based upon a pre-determined value for each level; and
- issues the alert based on result of the determination and classification for the one or more mobile devices regarding device behavior.

12. The system of claim 11, wherein the one or more mobile devices further comprise any one or more of: an IoT device enabled for connectivity and a monitoring device installed in the IoT device.

13. The system of claim 12, wherein device information for the one or more mobile devices comprises any of: a device identifier, location of the device, duration of time spent by the device at a specific location, speed of the device, acceleration/deceleration of the device, ignition status of the device, fuel level of the device, battery level of the device, plugged/unplugged status of the device and duration of time for which no device information is received, or a combination thereof.

14. The system of claim 11, wherein sorting the received device information based on pre-determined criteria further comprises separating one or more device data values based on data fields.

15. The system of claim 11, wherein evaluating the sorted device information to determine if the device information satisfies the specified condition further comprises comparing value in a specified data field to a threshold value specified for that data field using a pre-determined criteria for satisfying that condition.

16. The system of claim 11, wherein issuing the alert based on the result of determination comprises sending email, SMS or push notification to an user interface.

17. The system of claim 11, wherein issuing the alert based on the result of determination further comprises indicating severity of alert based on pre-determined criteria.

18. The system of claim 17, wherein severity of alert may be indicated by using different color for each level of severity.

19. The system of claim 11 further comprises providing a user interface to specify conditions.

20. The system of claim 16, wherein the user interface includes any one or more of: a mobile device, a computer terminal and a lap top.

21. A non-transitory computer-readable medium having executable instructions stored therein that, when executed, cause one or more processors corresponding to a system for issuing alerts regarding device behavior of mobile devices, having a database and a user interface to perform operations comprising:
- receiving device information for one or more mobile devices;
- sorting the received device information based on pre-determined criteria;
- evaluating the sorted device information to determine if the device information satisfies a specified condition for issuing alerts regarding device behavior,
  - wherein the alerts include any of: stop time alert, dwell time alert, offline alert, crash alert, fuel drop alert, unplugged device alert, tow alert, secure parking alert, or a combination thereof; and
  - wherein the specified condition for issuing alerts regarding device behavior comprises any of: time, duration, voltage, speed, place, ignition status, radius for geofence, fuel level, power level/battery status, monitoring device status, vehicle deceleration, or a combination thereof;
- classifying an alert as any one of: critical, warning or information, based upon a pre-determined value for each level; and
- issuing an alert based on result of the determination and classification for the one or more mobile devices regarding device behavior.

* * * * *